United States Patent
Coury et al.

(10) Patent No.: US 6,361,697 B1
(45) Date of Patent: Mar. 26, 2002

(54) DECONTAMINATION REACTOR SYSTEM AND METHOD OF USING SAME

(76) Inventors: William S. Coury, 2830 Bay Shore Cir., Sarasota, FL (US) 34234; Griscom Bettle, III, 1660 Stoneridge Ter., Sarasota, FL (US) 34232

(*) Notice: Subject to any disclaimer, the term of this patent is extended or adjusted under 35 U.S.C. 154(b) by 0 days.

(21) Appl. No.: 09/564,621

(22) Filed: May 4, 2000

Related U.S. Application Data

(63) Continuation-in-part of application No. 08/890,244, filed on Jul. 10, 1997, now Pat. No. 6,117,334, which is a continuation-in-part of application No. PCT/US95/00316, filed on Jan. 10, 1995.

(51) Int. Cl.[7] ................................................. C02F 1/72
(52) U.S. Cl. .................... 210/759; 210/760; 210/763; 210/765
(58) Field of Search .............................. 210/758–765

(56) References Cited

U.S. PATENT DOCUMENTS

| | | | |
|---|---|---|---|
| 3,336,099 A | 8/1967 | Czulak et al. | 21/102 |
| 3,372,808 A | 3/1968 | Sabo | 210/95 |
| 3,399,135 A | 8/1968 | Conley, Jr. et al. | 210/42 |
| 3,442,802 A | 5/1969 | Hamilton et al. | 210/63 |
| 3,487,016 A | 12/1969 | Zeff | 210/18 |
| 3,732,163 A | 5/1973 | Lapidot | 210/47 |
| 3,923,657 A | 12/1975 | Roser | 210/95 |
| 4,007,118 A | 2/1977 | Ciambrone | 210/63 Z |
| 4,044,720 A | 8/1977 | Fast | 119/3 |
| 4,189,363 A | 2/1980 | Beitzel | 204/157 |
| 4,252,654 A | 2/1981 | Leitzke et al. | 210/760 |
| 4,255,257 A | 3/1981 | Greinter et al. | 210/709 |
| 4,270,926 A * | 6/1981 | Burk | |
| 4,377,017 A | 3/1983 | Herpers et al. | 15/320 |
| 4,696,739 A | 9/1987 | Pedneault | 210/121 |
| 4,798,168 A | 1/1989 | Vadseth et al. | 119/3 |

(List continued on next page.)

FOREIGN PATENT DOCUMENTS

| | | |
|---|---|---|
| DE | 3007783 A1 | 9/1981 |
| DE | 228438 A1 | 10/1985 |
| FR | 2440338 | 5/1980 |
| FR | 2614176 | 10/1988 |
| GB | 431041 | 6/1935 |
| GB | 2026283 | 2/1990 |
| NO | 60157 | 11/1938 |
| SU | 1409176 | 7/1988 |
| WO | WO 81/01526 | 6/1981 |
| WO | WO 88/08665 | 11/1988 |

OTHER PUBLICATIONS

J. Hoigné, Mechanisms, Rates and Selectivities of Oxidations of Organic Compounds Initiated by Ozonation of Water, 1 Handbook of Ozone Technology and Applications 341–375 (Rip C. Rice and Aharon Netzer, eds.) (1982).

Gary R. Peyton, Advanced Oxidation Processes: Basic Principles, (Office of Environmental Chemistry, Illinois State Water Survey) (Principles and Practices of Chemical Oxidation in Wastewater Treatment, International Chemical Oxidation Association and Vanderbilt University, Tue., Feb. 14, 1995, Vanderbilt Plaza Hotel, Nashville, Tennessee).

*Primary Examiner*—Chester T. Barry
(74) *Attorney, Agent, or Firm*—Needle & Rosenberg, P.C.

(57) ABSTRACT

Methods for decontaminating contaminated water comprise treating the contaminated water with oxidizers such as oxygen, ozone, and/or hydrogen peroxide to provide a reaction mixture, and contacting the reaction mixture with a free radical inducer. Preferably, the methods of the invention and the apparatus used therefore induce the presence of small bubbles of oxygen and/or ozone, but minimize the presence of large visible bubbles of oxygen and/or ozone.

20 Claims, 9 Drawing Sheets

U.S. PATENT DOCUMENTS

| | | |
|---|---|---|
| 4,807,615 A | 2/1989 | Nakagawa et al. .... 128/203.12 |
| 4,898,679 A | 2/1990 | Siegel et al. ................. 210/752 |
| 5,043,080 A | 8/1991 | Cater et al. .................. 210/748 |
| 5,068,030 A | 11/1991 | Chen ............................ 210/95 |
| 5,082,558 A | 1/1992 | Burris ......................... 210/167 |
| 5,114,576 A | 5/1992 | Ditzler et al. ............. 210/195.1 |
| 5,116,574 A | 5/1992 | Pearson .......................... 422/3 |
| 5,122,165 A | 6/1992 | Wang et al. .................... 55/38 |
| 5,130,032 A | 7/1992 | Sartori ....................... 210/748 |
| 5,173,257 A | 12/1992 | Pearson .......................... 422/3 |
| 5,178,755 A | 1/1993 | LaCrosse .................... 210/195 |
| 5,189,981 A | 3/1993 | Ewald, Jr. ...................... 119/3 |
| 5,190,659 A | 3/1993 | Wang et al. ................. 210/663 |
| 5,192,452 A | 3/1993 | Mitsui et al. ............... 210/760 |
| 5,207,993 A | 5/1993 | Burris ......................... 422/256 |
| 5,275,732 A * | 1/1994 | Wang |
| 5,302,298 A | 4/1994 | Leitzke ....................... 210/748 |
| 5,316,673 A | 5/1994 | Kohlmann et al. ......... 210/251 |
| 5,336,413 A | 8/1994 | van Staveren .............. 210/650 |
| 5,346,617 A | 9/1994 | Costello ...................... 210/192 |
| 5,364,537 A | 11/1994 | Paillard ...................... 210/743 |
| 5,380,471 A * | 1/1995 | Ban |
| 5,397,490 A | 3/1995 | Masumoto et al. ....... 252/62.55 |
| 5,431,861 A | 7/1995 | Nagahiro et al. ......... 261/140.1 |
| 5,518,637 A | 5/1996 | Myers ......................... 210/760 |
| 5,552,052 A * | 9/1996 | Mazewski |
| 5,674,312 A | 10/1997 | Mazzei .......................... 95/261 |
| 5,711,887 A | 1/1998 | Gastman et al. ............ 210/748 |
| 5,772,886 A * | 6/1998 | Bettle |
| 5,843,307 A | 12/1998 | Faivre et al. ............... 210/192 |
| 5,845,993 A * | 12/1998 | Shirtum et al. |
| 5,849,201 A | 12/1998 | Bradley ....................... 210/752 |

* cited by examiner

DECONTAMINATION REACTOR SYSTEM AND METHOD OF USING SAME

This application is a continuation-in-part application claiming priority to U.S. patent application Ser. No. 08/890,244, filed Jul. 10, 1997, now U.S. Pat. No. 6,117,334, which was a continuation-in-part of Applicant's International Application PCT/US95/00316, designating the United States, which was filed Jan. 10, 1995. The contents of both parent applications are hereby incorporated in their entirety by this reference.

BACKGROUND OF THE INVENTION

1. Field of the Invention

The invention relates to waste water decontamination. For example, one embodiment of the invention relates to a reactor system for and method of maintaining a substantially two-phase (liquid/solid) operating environment within an ozone supersaturated decontamination reactor, thereby maximizing the contact of contaminants with ozone and oxygen particles, while minimizing loss of catalytic material due to turbulence associated with expansion of free ozone and/or oxygen. The invention, however, is not limited to this specific embodiment.

2. Background Art

Ozone-based decontamination of water is known. For instance, U.S. Pat. No. 4,696,739 (hereinafter "the '739 patent") discloses a water purification apparatus having multiple countercurrent ozone extraction columns. The apparatus, however, involves a three-way (gas/liquid/solid) reaction vessel. See Col. 2, lines 56–64. The apparatus is designed to bubble the ozone through the liquid. Col. 1, line 51.

The device disclosed in U.S. Pat. No. 3,336,099 (hereinafter "the '099 patent") is an apparatus for sanitizing liquids. The '099 patent apparatus includes baffles, to enhance the gas/liquid contact. However, the '099 patent apparatus, like the '739 patent apparatus, permits the ozone/air to bubble in the reactor.

U.S. Pat. No. 5,114,576 discloses a first ozonation of waste water followed by a catalytic decomposition of the remaining ozone before discharge of the cleansed fluid. U.S. Pat. No. 5,116,574 (hereinafter "the '574 patent") discloses multiple extraction systems with recycled exhaust gas to increase overall ozone usage efficiency. The '574 patent also discloses the use of discrete modules to effect a fixed percent improvement for each module.

U.S. Pat. No. 4,007,118 (hereinafter "the '118 patent") discloses an apparatus for ozone oxidation of waste water using catalytic media reactors where the granules are contained in a filter bag. The '118 patent also discloses the use of an upflow, dispersed catalyst bed where the granules are dispersed with ozone-containing gas, while the fines are collected downstream of the dispersed bed and recycled back to the bed. The '118 patent further discloses the catalytic reactors operating at pressures above atmospheric.

U.S. Pat. No. 5,173,257 discloses the simultaneous use of gaseous ozone and dissolved ozone to sanitize solid particles and react with dissolved contaminants. U.S. Pat. No. 5,190,659 discloses the use of a complex filter/valve apparatus to automate the necessary steps of cleaning, backwashing and reusing an ozone-reactive filter. U.S. Pat. No. 4,898,679 (hereinafter "the '679 patent") discloses the use of near freezing temperatures to increase the concentration of ozone in water. In the '679 patent, the supercharged water is then heated at the point of use and used to disinfect or decontaminate sludge, other contaminated fluids or equipment.

In prior systems, the task of ozonating water and catalytically decomposing the ozone to continue the decontamination has been complicated by the demands of handling a 3-phase system (gas/liquid/solid). Therefore, there exists a need for an apparatus and method capable of performing decontamination substantially in two phases while maximizing ozone concentration.

Investigators Hoigne and Bader originally elucidated a complex, core free-radical mechanism and their work was added to by Peyton and Zappi. Their mechanism dictates that ozone and hydrogen peroxide form hydroxyl free radicals which in turn oxidize the refractory organics or halogenated organics. The hydroxyl radical is formed from a number of sources: (1) from added hydrogen peroxide that is irradiated with UV light and forms radicals directly; (2) from added peroxide that dissociates in water, where the anionic species then becomes a radical; (3) from dissolved ozone that is irradiated with UTV light to become a radical directly; (4) from dissolved ozone that is irradiated with UV light and, with water, becomes hydrogen peroxide and, thereafter, a radical; (5) from dissolved ozone that decays directly into radicals; or (6) from dissolved ozone that is catalytically decomposed into free radicals, through an as yet undefined mechanism.

Each of these mechanisms has a different reaction rates and equilibrium constants. For example, the amount of ionic species available to make radicals is strongly affected by pH. The effective dose of free radicals, those that work to oxidize contaminants is strongly consumed by naturally occurring free radical terminators. Terminators include dissolved bicarbonates, humic and fulvic acids. High doses of hydrogen peroxide also terminate free radical reactions. High doses of radicals also terminate, i.e., self-extinguish, when two radicals collide. The net effective dose is the total dose of radicals less the radicals that terminate.

Hoigne first proposed, and Peyton confirmed, that a radical propagating mechanism exists with available oxygen. If a radical mechanism is initiated, and if the number of initiators exceeds the number of terminators, then the oxygen radical propagation step may occur. Peyton demonstrated this propagation step by bubbling ozone-in-oxygen gas through a batch reactor. Once the radical process was initiated, the ozonator was shut off and the oxygen left on. The rate of substrate removal clean up did not change after the ozone was turned off until the substrate was consumed.

This process approach effectively demonstrated the chemistry of radical chain reactions in a batch reactor. But the continued bubbling of large amounts of gas through a continuous flow reactor stirs and mixes the two fluids, thus destroying any plug flow characteristics in the reactor. Plug flow reactors are the design of choice when oxidizing micro-levels of pollutants down to non-detect levels. It is well understood that it takes three or more stirred reactors in series to simulate the kinetics of a single plug flow reactor. Adding multiple reactors in series to overcome the difference between a stirred reactor and a plug flow reactor adds cost and complexity.

A substantial number of aqueous streams must be treated to meet government laws for release into the environment. Such aqueous streams typically contain one or more impurities, such as suspended solids, dissolved organic matter, microorganisms, dissolved mineral matter and the like. Ozone has been used for decades to remove low concentrations of these contaminants. Historically, ozone has not been used for highly concentrated contaminants because it is difficult to get enough ozone into the water and the capital and energy costs are too high versus competing technologies. For example, ozone is widely used to disinfect drinking water, or to tertiary treat municipal waste, but it is not used to treat water produced from oil and gas recovery because it is cheaper to deep well inject this water. Likewise, the water from making pesticide and herbicide intermediates, which can have a COD ("Chemical Oxygen Demand") of 10,000 is hauled off and deep well injected as a hazardous waste because the nitro phenols would otherwise poison the municipal treatment plant. In addition, these high concentration fluids are very sudsy. Using a gas to oxidize the contaminants introduces a problem of stable suds formation pump and consequent cavitation.

Ozone, however, has found use in specific high concentration environments where no other technology will work, such as color removal from non-biodegradable color components in the pulp and paper industry, where it is common to encounter a low sudsing stream because the biodegradable components have already been removed by traditional processes. U.S. Pat. No. 5,397,490 to Dickerson describes a process that provides ozone doses that are 2–4 times the normal solubility of ozone in water per multi-zone treatment at gas-to-liquid ratios of 2:1. Improved results are reported as the dose increases. Unfortunately, the Dickerson process leaves behind increasing amounts of unused ozone as the dose increases. Therefore, there exists a need for a process that can achieve similar ozone doses in the treated water with no unused ozone. Such a process would be inherently less expensive while providing comparable oxidation effectiveness.

Ozone extraction and ozone reactors are well known in the prior art. In general, the art can be divided into two categories: Ozone extraction with integral reactors such as shown as in U.S. Pat. No. 5,173,257 to Pearson and ozone extractors with subsequent reactors in U.S. Pat. No. 5,114,576 to Ditzler, or free radical generators in U.S. Pat. No. 5,302,298, to Leitzke. Both categories are characterized by capture of the exhaust gas and then either venting the gas, drying and recycling the gas, or recycling the gas to an upstream gas recycling (recovery) system. Prior systems also show multiple zones in the extraction process, usually cocurrent and counterflow, but other combinations are also described. All prior systems using multiple extraction zones commingle the exhaust gas from the extractor/reactor and pass the commingled gas to a serially communicating next stage.

When multiple, serially connected extraction zones exist in a given extractor/reactor, one zone has a higher residual ozone gas concentration (after extraction) than the other zone (after extraction). Thus one zone has a relatively higher concentration of residual ozone than in the "average" concentration exhaust gas. "Average" gas is then passed to the next serially connected unit operation.

Prior devices recognize that ozone extraction is not 100% effective, particularly when the ozone dose to be extracted exceeds the natural solubility of ozone in water (about 13 ppm). In these situations, prior devices generally recycle the exhaust gases to a serially connected prior extractor/reactor module (Pearson, Dickerson, Leitzke). In one such device, up to 200 ppm ozone is fed to the reactor where four serially connected extractor/reactor modules are used to extract the ozone. This system still only achieves 71% extraction efficiency.

In other prior systems, LaRaus ('040) uses similar cocurrent then countercurrent extraction zones. Those skilled in the art would follow the process of LaRaus with a free radical inducer zone as in Leitzke ('298) or Ditzler (U.S. Pat. No. 5,114,576). Those skilled in the art will recognize that there is more residual unextracted ozone as the water to be treated gets cleaner as fluid flows serially through the prior art processes because there are fewer substrate molecules remaining to react with available ozone. The present invention is distinguished over LaRaus by how the unentrained gases are handled. LaRaus commingles waste gas from the cocurrent and countercurrent section, thus taking a high ozone-containing gas from one section, commingling that with low concentration gas from a second zone to achieve average, greater than nil, ozoneconcentration gas commingled with exhaust gas. This practice is true of all the early prior art. LaRaus scrubs this ozone-containing, commingled gas in his feed tank and routes his vented exhaust underground. Improvements were made by Leitzke, who also commingles his countercurrent and cocurrent exhaust gases and adds an additional entire module to scrub his exhaust. The double scrubbed gas is then vented, passed through an ozone-destruct unit or dried and recycled to the ozone generator, a very complex series of steps to contend with gas that was not completely extracted. An additional problem with the Leitzke process is that liquid scum must exit through a gas vent, through a water-sensitive catalytic destruct unit or through a drier into a gas compressor in order to exit the system.

Pearson ('257 and '574) uses only a single cocurrent extractor/reactor in his reaction modules and recognizes the inefficiency inherent in this design, because the design serially connects extractor/reactor modules with a double scrubbing module that has no fresh ozone addition before venting the exhaust from the double scrubbing extractor to an ozone destruct unit to handle any still unextracted ozone.

A further improvement is the process invented by Dickerson. In the Dickerson process, gas is extracted in a cocurrent/countercurrent high pressure loop. The tank is divided into zones where the first zone is the countercurrent extraction zone. The second, lower zone is a combined countercurrent/cocurrent extraction, free radical inducer zone. Dickerson teaches that these zones can be separate tanks or two zones in one tank. Either way, the gases from the two zones are commingled and recycled upstream as in Leitzke. Scum is not well handled in the Dickerson process because expensive, automatic level control valves maintain a liquid level substantially below the top of the tank. This means that scum cannot escape until it builds up sufficiently to rise to the gas outlet line. With sufficient recycle time, scum will migrate sequentially upstream to the first module (with the dirtiest, sudsiest water) and exit through the gas vent line to an undisclosed area.

Clearly there is a need for a process that can extract large absolute quantities of ozone, safely and at substantially 100% efficiency.

When large quantities of gaseous ozone are extracted in water containing, for example, organic molecules, the resulting water is foamy and often times creates a floating blanket of scum. This scum has to be removed from the tops of the extractors. Much of the prior art allows this scum to pass with the exhaust gas back to the feed tank. Other art serially connects the gas and any scum directly to the exhaust system, to a catalytic ozone destruct unit, or directly to a drier and an air compressor. Those skilled in the art recognize that catalytic destruct units are fouled by free moisture, and that free water may not pass the gas dryer stage. The examples described by these practitioners are of low sudsing fluids that do not create scum. There is a particular need to handle internally generated scum as part of a practical process.

In the waste water remediation business, cost is a major consideration. There is a strong need for lower cost processes that are simple to operate, inherently safe and do not require sophisticated operators to run. There is a need for a process that can achieve very high gas transfer per extractor/reactor module and have substantially no free gaseous ozone in the exhaust gas that is serially passed to the next unit operation. A system that used multiple gas extractors in a given extractor/reactor module and did not commingle the exhaust gases from each zone could pass the high concentration ozone exhaust gas to the inlet of the low ozone extraction zone, whereupon the low zone could exhaust substantially ozone-free gas. A system like this would be more efficient and require fewer, serially connected extractor/reactor modules, thus reducing the cost of the equipment substantially. A system like this could be designed to collect and transfer the scum along with the high concentration exhaust gas into the low concentration zone where it can be collected and fed back to the feed tank for subsequent, well known treatment.

SUMMARY OF THE INVENTION

It is an object of the present invention to simplify the ozonation/deozonation process by eliminating the excess equipment currently required to handle catalyst fines. It is a further object of the present invention to eliminate automation as practiced in the prior art. It is a further object to eliminate non-reactive filtration systems and their associated maintenance. Another object of the present invention is to eliminate the drawbacks of 3-phase systems from the ozonation/catalytic deozonation process. A further object is to provide an ozonation reactor zone that is substantially free of large, visible gas bubbles.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Figure 1:
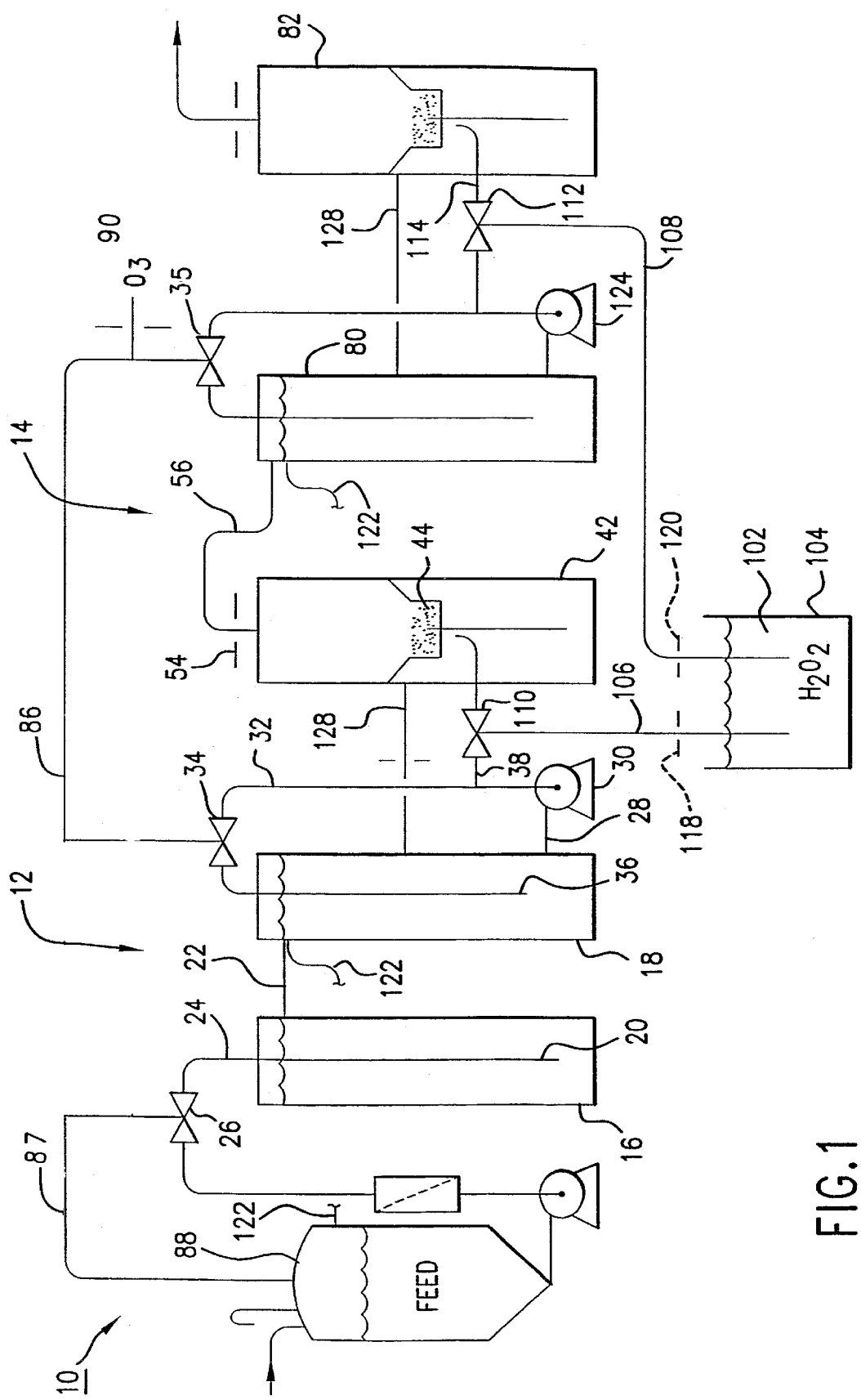
FIG. 1 is a schematic illustration of the preferred embodiment of the new and improved system for purifiing water through free radical reactions effected by ozone, peroxide and available oxygen constructed in accordance with the principles of the present invention.

The present invention may be understood more readily by reference to the following detailed description of preferred embodiments of the invention and to the Figures.

Before the present devices and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, various publications are referenced. The disclosures of these publications in their entireties are hereby incorporated by reference into this application in order to more fully describe the state of the art to which this invention pertains.

One aspect of the invention relates to a method of decontaminating a supply of contaminated liquid, comprising the steps of directing a supply of gas and the supply of contaminated liquid to a pump in fluid communication with a pressurizable reaction vessel having a means for introducing a fluid, a means for expelling a fluid while retaining a pressure within the vessel, a catalyst, and a means for retaining the catalyst within the vessel, wherein the pump is in fluid connection with said means for introducing a fluid into said reaction vessel, operating said pump so that said supplied gas and the contaminated liquid are intermixed and forced under pressure through said means for introducing a fluid into the reaction vessel at a sufficient pressure such that within said reaction vessel the pressure substantially prevents the formation of large free bubbles of the gas, and operating said reactor system for a period of time sufficient to decontaminate the liquid to a preselected level of decontamination. This reactor may additionally be fed hydrogen peroxide.

One embodiment of the invention relates to a reactor system for decontaminating a supply of contaminated liquid, comprising a pressurizable reaction vessel having a means for introducing a fluid, a means for expelling a fluid while retaining a pressure within the vessel, a catalyst, and a means for retaining the catalyst within the vessel, a pump in fluid connection with said means for introducing a fluid into said reaction vessel, and a supply of gas in fluid communication with said pump, whereby said pump is operated so that the supplied gas and the contaminated liquid are intermixed and supplied under pressure to said means for introducing a fluid into the reaction vessel and whereby the pressurized gas and liquid mixture is maintained at a sufficient pressure within said reaction vessel to reduce the formation of large, fast rising bubbles of the gas within said reaction vessel.

Another aspect of the invention relates to the operation of a plug flow reactor in a mode substantially free of large, visible gas bubbles, but still have a reservoir of supersaturated (i.e., dissolved and undissolved), available oxygen greater than the amount of oxygen predicted by Henry's law, i.e., greater than 8–10 mg/l dissolved oxygen ("D.O.").

Yet another aspect of the invention involves purifying water through the use of ozone, peroxide and available oxygen. For example, the invention relates to a process for purifying a liquid waste stream in a purification process module comprised of two or more serially connected separated purification zones, inclusive of a lead purification zone and a tail purification zone, wherein the exhaust gas from each purification zone is captured independently and where the higher concentration, independently captured exhaust gas is recycled to the infeed of the purification zone that will subsequently discharge the lower concentration, independently captured exhaust gas.

The present invention also provides a process for purifyng a liquid waste stream in a purification process module comprised of two or more serially connected separated purification zones, inclusive of a lead purification zone and a tail purification zone, wherein the exhaust gas from each purification zone is captured independently and where the higher concentration, independently captured exhaust gas is recycled to the infeed of the purification zone that will subsequently discharge the lower concentration, independently captured exhaust gases.

In accordance with the present invention, it has been newly discovered that, in multiple zone extractors, separating the exhaust gas in the high concentration zone from the low concentration zone with intermediate capture, remixing and reinjection of substantially all the high concentration exhaust gas into the water entering the low concentration zone with subsequent venting to the atmosphere of the "double-scrubbed" exhaust gas provides unexpected benefits. Higher absolute ozone transfer can occur in a single module (up to 50 ppm/module). No free ozone is vented to the atmosphere. Continuous skimming of scum, for example, floating, gassy mud, prevents solids build-up in gas lines. Automatic level controls are eliminated by the continuous skimming. Pump cavitation is eliminated. Higher absolute clean-up occurs, for BTEX (Benzene, Toluene, Ethylbenzene, Xylene) removal in produced water, countercurrent alone gave, on average, 41% removal, while cocurrent/countercurrent gave 90% removal per purification module. High concentration waste streams can now be handled (the prior art dealt with low concentration streams, 10–200 v. 10,000 ppm COD. Ozone is injected at pressures less than atmospheric so any leaks are into the process, not out to the work environment, thereby making the work area inherently safer. Excess, large-bubble gas is extracted form the high ozone zone and converted into small bubbles in the second scrubbing. Large bubbles cause pump cavitation, while smaller bubbles do not.

With the second scrubbing, large volumes of gas can be successfully handled by normal liquid pumps. A higher Gas/Liquid ratio provides for better cleaning per module. In accordance with the present invention, there is provided a process and apparatus for purifying an aqueous waste stream in a purification process unit comprised of cocurrent and countercurrent gas extraction zones and a free radical inducing zone. The gas from each extraction zone is handled separately because one exhausts a high concentration of unextracted ozone and the other exhausts substantially no ozone. The free radical inducer can be one of several types well known to those skilled in the art.

a) Flowing said aqueous stream to be purified serially through the extraction zones, starting with the cocurrent extraction zone, wherein said stream is introduced through a Venturi directly into the bottom of the cocurrent extraction zone where the gas and liquid flow concurrently to the top of the extraction zone. The top of the cocurrent extraction zone is also in fluid communication with the feed tank, as taught by LaRaus ('040), to allow excess fluid, generated scum and substantially ozone-free, relatively-large-bubble gas to recycle to the beginning of the process. The substantially ozone-free gas is allowed to vent to the atmosphere using well known techniques.

b) The cocurrently extracted fluid, containing small-bubble gas and partially treated waste stream, flows down the countercurrent column towards the serially connected pump inlet. Fresh ozone is drawn into the countercurrent column through the ozone-addition Venturi to the countercurrent extraction zone, to the pump, and back to the Venturi. Small bubbles are entrained in the fluid flowing to the pump inlet, while large bubbles rise to the top of the countercurrent extraction column. The escaping large bubbles, generated scum rising to the top of the countercurrent column and excess feed fluid are under/overflowed to the double scrubbing Venturi feeding the cocurrent column, thus continuously skimming the countercurrent zone and recycling all the ozone-containing gas/liquid mixture that is not transferred into the free radical inducing step, into a very dirty, upstream fluid that readily reacts with substantially all remaining free ozone.

c) There is a fluid communication means from the pump to a free radical inducer zone. Thus, high ozone concentration, micro bubble, highly gassy fluid is drawn from the recirculating loop into the free radical inducer zone.

In a preferred embodiment of the present invention, an effective amount of ozone is introduced into the countercurrent extraction zone and is moved serially into a free radical inducing zone where most of the remediation takes place. Ozone that is not extracted in the countercurrent extraction zone is extracted in the cocurrent extraction zone. Extraction columns are continuously fed more fluid than is fed to the free radical inducing zone so that the extraction columns always remain full of fluid without complex automatic level controls and continuous skimming occurs in both extraction zones.

In another preferred embodiment, the three zones so far described are a module. Strings of modules are connected serially with exhaust gases recycled upstream to the prior countercurrent column and finally to the feed tank, as is described in the prior art.

In one embodiment, the invention is preferably a plurality of modular gas extraction tanks in series. Each modular gas extraction tank or vessel is connected, under pressure, to an upflow catalyst bed with an underflow feedback line connected to the bottom of each extraction tank. The upstreammost extraction tank overflows continuously back to a feed tank.

Each pressurized catalytic tank discharges to the next extraction tank through a static back-pressure device such as, but not limited to, an orifice or a partially open manually-operated valve. One skilled in the art would recognize that this system is simpler than prior art systems because it has no moving parts (except for the module pump), it has no automatic control devices, and all flows are controlled by both the pump pressure and gravity.

The fluid in the extraction tanks is a gas/liquid mixture having a broad distribution of bubble sizes. The smallest bubbles, whose size will vary depending upon user-defined reactor parameters, containing undissolved ozone and oxygen, are entrained by the downflow liquid velocity and enter the pump suction together. Larger bubbles rise to the top of the extraction tank and eventually exhaust to the atmosphere. Exhaustion is accomplished by any one of several well known techniques.

The small bubble/liquid mixture is pressurized and mixed in the pump. After mixing and pressurization, the bubbles dissolve into the liquid according to Henry's law and any undissolved bubbles are made smaller by the increased pressure. This process is well known and is called supersaturation by those of ordinary skill in the art. A number of well developed techniques for supersaturation have been developed by the beer and soft drink industries. Any one of these techniques would be suitable for the present invention. However, for ease of description, the preferred embodiment uses pump pressure and entrained gas as a technique. This embodiment is not meant to limit the scope of the present invention.

Supersaturation increases the concentration of ozone and oxygen in the liquid mixture beyond that which would be predicted by Henry's Law. Supersaturated, pressurized fluid is contacted with the pressurized catalytic reactor at the bottom of the reactor tank. The supersaturated water is forced to flow up through a granule support plate perforated with a multitude of small, fluid permeable holes and then through the fluid-permeable catalyst bed. Any number of well-known fluid distribution techniques would be operable.

Because ozone is approximately thirteen (13) times more soluble in water than oxygen, as the ozone catalytically decomposes to oxygen, microscopic bubbles are created on the individual granule's surfaces. This oxygen occludes on the granule and, depending upon the size of the granule and the amount of static pressure on the system (e.g., at pressures below about 10 psig), causes the granule to float up and out of the bed. At pressures greater than about 10 psig, the oxygen released by the catalytic destruction of ozone remains supersaturated and, therefore, does not occlude to the granule. In this manner, the catalyst bed remains totally within the reactor. One skilled in the art would recognize that the size, shape and density of the granules, the fluid density, velocity, viscosity and temperature are among the parameters which affect the critical pressure where undesirable "lifting" bubbles are first able to form. Therefore, 10 psig is simply an example of one transition pressure suitable for one set of conditions.

To completely simplify the catalytic ozonation process, the transition pressure must be experimentally determined. A proper transition pressure could be readily calculated or determined by one skilled in the art with only ordinary experimentation. The reactor must be operated at pressures above this transition pressure. Because operation above the transition pressure substantially prevents the formation of any large bubble gaseous oxygen, the reactor performs as a two-phase (liquid/solid) system. Therefore, the upstream extraction process must not over-deliver gas to the pump inlet. If over-delivery occurs, then there is a likelihood that cavitation will occur within the pump and oversize bubbles will enter the reactor. However, the use of a sight glass located at the pump discharge allows the operator to determine experimentally the extraction conditions which maximize ozone supersaturation without generating, via undesirable cavitation, visible bubbles in the pressurized effluent.

In another embodiment, an alternate way of determining whether gas is present in the reactor (from cavitation or improper parameter selection), is to survey the discharge orifice for audible "popping" sounds. When free gas (i.e., undissolved gas) is present at the discharge orifice, the gas expands rapidly as it meets suddenly reduced pressure once passing through the orifice. The rapid expansion of the gas produces an audible "popping" sound as two-phase fluid passes through the pressure control device. However, when free gas is not present, no audible "popping" can be heard.

Applicant believes that the supersaturated gas evolves from the solution slowly (after the drop in pressure) and thus does expand at a rate capable of producing an audible "popping" sound.

The optimal operating conditions for the reactor are substantially at, but just below, the visible bubble stage. At these conditions, the decontaminating fluid has the maximum practical ozone concentration. Those skilled in the art could, with only routine experimentation, design two-phase fluid bed reactors that retain substantially all the catalytic granules in the reactor, even after the granules grind themselves into very fine particles. The prior art reactors, however, cannot achieve this because the presence of three phases (i.e., the presence of large gas bubbles) creates turbulence as bubbles rise faster than the surrounding liquid. These bubbles then carry granule fines with them, thereby carrying catalyst out of the reactor vessel. Prior art practitioners then had to attempt to recapture the fines, dispose and replace or recycle fines, or attempt to hold the catalyst in filter bags and distribute fluid through the filter bags. The simple process of the present invention substantially eliminates all of this unnecessary complexity and efficiently solves the problems of the prior art systems.

Figure 7:
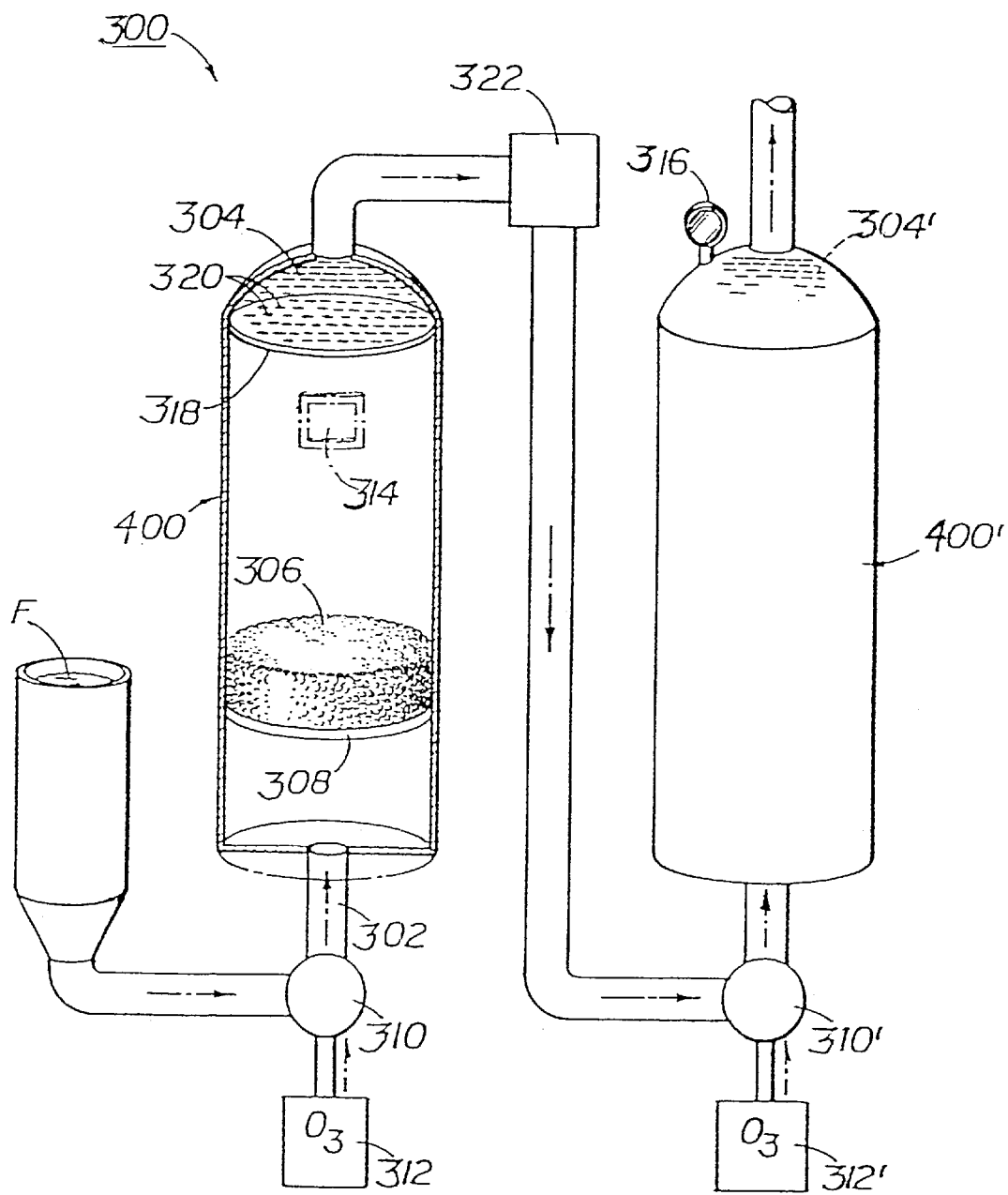
FIG. 7 shows a schematic view of the reactor system of one embodiment of the present invention.

Referring now to FIG. 7, the present invention provides a reactor system 300 for decontaminating a supply of contaminated liquid F. The reactor system 300 comprises a pressurizable reaction vessel 400 having a means for introducing a fluid 302. This means for introducing a fluid 302 may be made of any suitable material, such as metal or plastic, and may be shaped in a variety of shapes, such as a pipe.

The reactor system 300 also has a means for expelling a fluid 304 while retaining a pressure within the vessel 400. This means 304 must be capable of letting decontaminated fluid escape from the reaction vessel 400 while providing enough flow resistance to keep the pressure within the reaction vessel 400 at a suitable level.

Inside the reaction vessel 400 is a catalyst 306 and a means for retaining the catalyst 308 within the vessel 400. For instance, a granular catalyst 306 may be placed upon a perforated plate 308, where the perforations (not shown) are large enough to permit substantially unrestricted flow of fluid therethrough while preventing the catalyst 306 from occluding the means for introducing a fluid 302.

The reactor system 300 further uses a pump 310 in fluid connection with the means for introducing a fluid 302 into the reaction vessel 400. To this pump 310 is attached a supply of gas 312 in fluid communication therewith. This gas 312 is used, in combination with the catalyst 306, to decontaminate the liquid stream.

Operation of the reactor system 300 occurs in such a way that when the pump 310 is operated, the supplied gas 312 and the contaminated liquid F are intermixed. The gas/liquid mixture is supplied under pressure to the means for introducing a fluid 302 into the reaction vessel 400. The pressure from the pump 310 is maintained within the reaction vessel 400 at a sufficient pressure within the reaction vessel 400 to minimize the formation of bubbles of the gas 312 within the reaction vessel 400. The means for expelling 304 must have sufficient flow resistance to maintain the pressure within the reaction vessel 400 while allowing decontaminated fluid to be expelled from the reaction vessel 400.

In a further embodiment of the basic reactor system 300, a plurality of reaction vessels 400 and 400' may be fluidly connected in series to one another. Therefore, complete decontamination need not occur in a single stage. Instead, partially decontaminated fluid may be fed from one reaction vessel's (e.g., 400) means for expelling into the pump associated with the next reaction vessel (e.g., 400'). An additional supply of gas 312' is provided for this second reaction vessel 400'. Upon exiting the final reaction vessel (e.g., 400') in the embodiment of this system 300, the effluent may collected, recirculated or otherwise discharged.

In a preferred embodiment, the operating parameters of the reactor system 300 may be checked using a means for determining the presence or absence of free gas, 314 or 316, within the reaction vessel 400. The substantial absence of free gas in the reaction vessel 400 is the most desirable operating condition. One such means 314 is a transparent portion, such as a viewing window, of said reaction vessel. Another such means 316 is a means for sensing a sound (also 316) and the sound sensing means 316 is located outside the reaction vessel 400', but in audio contact with the means for expelling a fluid 304' from the reaction vessel 400'. As pressurized liquid traverses the means for expelling 304', it is exposed to greatly reduced pressure. Free, but pressurized, gas bubbles tend to make an audible "popping" noise upon exposure to the reduced pressure. This popping can be detected with a means for sensing a sound 116. One such means 116 is a microphone (not shown) optionally in connection with an amplifier (not shown). The operator (not shown) can determine proper operating conditions within the reaction vessel 400 by listening for "popping" sounds.

Still referring to FIG. 7, in a preferred embodiment, the means for expelling a fluid 304 while retaining pressure within the vessel 400 can be a fixed orifice plate 318. Such a plate 318 has a one or more orifices 320 therethrough, with the number and diameter of the orifices 320 determined such that while pressurized fluid may escape through the orifices 320, the flow resistance created by the size of the orifices 320 is sufficient to retain a desired pressure inside the reaction vessel 400. Another means for expelling a fluid 304 while retaining pressure within the vessel 400 is a manually-operated valve (not shown).

Depending upon the type of decontamination desired, various types of supplied gases 312 may be used. In a preferred embodiment, the supplied gas 312 is ozone gas. Ozone gas ($O_3$) is known to those in the art as a powerful oxidizer and, when coupled with a suitable catalytic material, is capable of degrading many organic contaminants. Another supplied gas 312 may be oxygen, which is less potent, but still effective as a decontaminating agent in the presence of an appropriate catalyst 306.

In the embodiment depicted in FIG. 7, the catalyst 306 is granular. However, powdered catalysts (not shown), or catalysts of other shapes (not shown) are also useful for practicing the present invention, so long as they may be retained in the reaction vessel 400 in such a way as to not occlude the means for introducing a fluid 302 into the reaction vessel 400.

In a further preferred embodiment, the reactor system 300 can utilize a downstream granule capture and recovery device 322 in fluid communication with the means for expelling 304 a fluid while retaining pressure within the vessel 400. Thus, any catalytic material inadvertently expelled from a reaction vessel 400 can be recovered and appropriately recycled to the interior (not shown) of the reaction vessel 400.

The reactor system 300 may be used in a general method of decontaminating a supply of contaminated liquid F. This method comprises the steps of first directing a supply of gas 312 and a supply of contaminated liquid F to a pump 310 in fluid communication with a pressurizable reaction vessel 400. The reaction vessel 400 has the parts described above.

As stated above, this pump 310 is in fluid connection with the means for introducing a fluid 302 into the reaction vessel 400. Next, the pump 310 is operated so that the supplied gas 312 and the contaminated liquid F are intermixed and forced under pressure through the means for introducing a fluid 302 into the reaction vessel 400. The pump 310 must operate at a sufficient pressure so that, within the reaction vessel 400, the pressure is high enough to minimize the formation of bubbles of the gas 312. The reactor system 300 is operated in this state for a period of time sufficient to decontaminate the liquid to a preselected level of decontamination.

The method can be practiced using a reactor system 300 having a plurality of reaction vessels 400, 400', etc. fluidly connected in series to one another, as described above.

In a preferred embodiment of the operating method, the further step of monitoring whether there are bubbles in the reaction vessel 400 can be accomplished using a means for determining the presence or absence of free gas (e.g., 314 or 116) within the reaction vessel 400. Such means are described above.

In another preferred embodiment, effluent (not shown) from the reactor vessel 400 can be passed through a downstream granule capture and recovery device 322 in fluid communication with the means for expelling a fluid 304 while retaining a pressure within the vessel 400. The recovered granular catalyst 306 can then be reintroduced to an appropriate reaction vessel 400.

Further embodiments of the invention take into consideration the following. It is known that hydrogen peroxide is less expensive than ozone and, therefore, it is often advantageous to substitute peroxide wherever possible in AOP designs. It is also known that excess amounts of peroxide act as radical terminators. The traditional strategy has been to bleed peroxide into a reactor continuously or at a multitude of intermediate points. The problem with this strategy is how to get large, effective doses of radicals into a system. More ozone is difficult to add because it is a solubility-limited gas. More peroxide can be added but requires a gross excess, sometimes up to 10 times more than is normally needed, to add a significantly higher dose of effective radicals (i.e., total radicals less radicals consumed by terminators equals effective radicals doing beneficial oxidation).

In addition, if UV light is used to convert either ozone or peroxide into radicals, each requires a different UV wave length and, therefore, energy consumption increases dramatically. Moreover, when gross excess of radicals are made more or less all at once, such as in a UV lamp, the radicals can self-terminate when one radical encounters another. Again, to achieve a given number of effective radicals generated, an excess dose of ozone or peroxide is required. This is demonstrated by the peroxone process.

The peroxone process is a well known, low cost, ozone and hydrogen peroxide system at atmospheric pressure, measured at the column outlet. Ozone is bubbled continuously through columns, which keeps oxygen continuously available, and peroxide is added more or less continuously at each of several columns. The peroxone process works well in many micro-contamination, clean-up situations, but, unfortunately, the kinetics of the process are slow. If natural water does not contain high levels of terminators, then the peroxone process is low cost and works well. Where natural terminators exist, the clean-up kinetics are too slow and there are not enough effective radicals to do the clean up. If more peroxide is added, the excess peroxide acts as a terminator.

The optimum solution is 1) to marginally increase the catalytic radical generation time to avoid self-termination, 2)

to increase the absolute concentration of free radicals to create conditions for a chain reaction by insuring an excess of radicals over terminators, and 3) to lift and separate the free radical catalyst to prevent contaminant bridging between catalyst particles and consequent fouling and to insure that the thermodynamic maximum amount of oxygen is always available throughout the reactor. However, the time and concentration cannot be such that all the ozone is consumed in the catalytic beds. When this happens, contaminants can encapsulate individual granules. The contaminants have a lower specific gravity than the catalyst. The coated granules have a combined specific gravity less than a clean granule. The coated granules float to the top of the bed and make an undesirable coating in the bed. Since there is too little free ozone at the top of the bed, the granules never get clean. Excess ozone, >0.1 mg/l, at the reactor discharge insures that radicals are generated on substantially all the granules. This process keeps the bed from fouling. Free gas occludes to these fouled granules and floats them up and out of the reactor. All prior systems had to deal with these wayward granules.

If the ozone concentration exiting the reactor is less than 0.1 mg/l, conditions are ripe for fouling. If bed velocity is below 0.19 in/second., fouling occurs. In this testing, the fluidization point, the point of maximum bed height, is 0.4 in/second and first-increase-in-bed-height velocity was 0.18 in/second. Ideally, ozone discharge concentration is greater than 0.3 mg/l and fluid velocity in the bed is 0.3–0.4 in/second. Those skilled in the art will recognize that different catalysts will fluidize differently and would be able to determine fluidization conditions without undue experimentation.

It has now been surprisingly found that optimum reaction conditions can be achieved by (1) raising the pressure in the plug flow reactor, typically above one atmosphere, (2) by intentionally incorporating free oxygen and ozone gas with liquid, at atmospheric pressure, as it enters the pressurizing pump that feeds the plug flow reactor, and (3) by increasing fluid velocity to keep the catalyst fluid bed height substantially at its maximum and by adjusting the pH of the fluid F to about pH 7 to pH 10, more preferably about pH 8.5. The pump mixes and dissolves most, but not all, of the free gas as it creates pressure. The reactor is divided in two sections. The supersaturated liquid, and some free gas, enter the lower section of the reactor. The bottom of the reactor is fed first. Free large bubble gas rises and are recycled upstream and supersaturated liquid with entrained small bubbles, in equilibrium with the liquid, flows to the bottom. The supersaturated liquid and existing small bubbles are subsequently fed into the bottom part of the reactor in plug flow through a communication line. Because the liquid is devoid of fast rising free gas, essentially no internal mixing takes place and plug flow is maintained by the ready reserve of high surface area tiny bubbles at the thermodynamic maximum amount of oxygen in the reactor. These bubbles dissolve in the water as previously dissolved oxygen is consumed in the chain reaction. Thus, the decontamination is driven to the maximum by insuring that the thermodynamic maximum of oxygen is always maintained and that plug flow reaction conditions are maintained.

The bubbles that are retained are very small and have a diameter of less than 0.1 mm. It is well known that bubbles with radius less than about 0.9 mm have a linear drop in terminal velocity as bubble diameter gets smaller. That is, the slower the water velocity, the smaller the bubbles that are entrained and captured by the flowing liquid. Liquid velocities in the lower section of the reactor where the fluid travels at between 0.1 and 0.3 in/second extract bubbles with a radius of 0.1 to 0.2 mm.

The use of a means for determining the presence or absence of free gas (such as a sight glass or means for sensing a sound) at various points of the apparatus allows the operator to determine experimentally the extraction conditions which maximize ozone supersaturation, i.e., the generation of substantial quantities of bubbles having a diameter less than about 0.1 mm in diameter, without generating, via undesirable cavitation, substantial quantities of large, visible bubbles having diameters greater than about 0.9 mm in diameter.

In these conditions, the oxygen driven, radical chain reaction flourishes. In field studies on produced water from crude oil recovery using a reactor operating at 17 psig with ozone dose at 20 mg/l, the walls of the upper section of the reactor were substantially devoid of oil and grease for a distance equivalent to 4.08 minutes of post-catalytic reaction time. Above the 4.08 minute line, the walls were greasy. This means that the free radical chain mechanism continued for 4.08 minutes before terminating. At lower doses of ozone, the clean/greasy line was proportionately less than 4.08 minutes.

The implication of this unexpected finding is that any economic mix of free radical sources, such as ozone or peroxide, can be used. Also, an assortment of free radical inducers can be used, such as, but not limited to, UV, manganese dioxide, high pH, $TiO_2$, to force the initiation step. For the present invention a catalytic step with a residence time of only 3 seconds is ideal. Any further initiation provides excess self-termination. At a catalytic residence time above 12 seconds, no free ozone was generated and subsequent fouling was found. At bed velocities below about 0.2 in/second., catalyst fouling was found and loss of catalyst resulted. At bed velocities above 0.4 in/second., catalyst loss by over-fluidization was found. For the present invention, the optimum was between 0.25 and 0.34 in/second.

Another preferred embodiment reactor design intentionally overfluidizes the granular catalyst with velocities greater than 0.8 in/second. In this embodiment, there is no fluidized bed and catalyst is lightly distributed throughout the lower section of the catalytic reactor. The top section of the reactor has a significantly larger diameter to slow the linear fluid velocity enough so that the catalyst granules fall back into the lower, narrow diameter section of the reactor. Those of ordinary skill in the art would be able to determine, using only routine experimentation, the appropriate diameter for the upper section of the reactor. This embodiment is an alternative way to slow the free-radical initiation rate to a level where radical-to-radical termination is minimized.

Surprisingly, it was also discovered that increasing the reactor pressure stimulated the production of free radicals. In an experiment on clean water, without free radical inducers, the reactor was fed at 21 mg/l of ozone at a pressure of 15 psig and then 38 psig. The exit value of ozone was 1.3 mg/l and 0.9 mg/l at the two pressures respectively, showing a slight increase in ozone decay at higher pressure and a loss of ozone in both pressurized tanks. With benzene spiked tap water and no catalyst, benzene was reduced 81% in a single pressurized module at 17 psig (16 mg/l ozone dose). With catalyst, the benzene was totally eliminated in one module at a similar ozone dose. In an unpressurized reactor, the benzene was reduced only 15%, 2.7 mg/l ozone doze.

In a further test, with naturally produced water at pH 6.5, ozone was added and fed to the pressurized plug flow reactor. In this test there were five stages. The first is the feed tank and the second is an atmospheric tank fed with 10 mg/l ozone. Process stage three, at 17 psig, was fed at 23 mg/l and process stages four and five, also at 17 psig, were fed at 12 mg/l each.

| STAGE | OZONE DOSE | PRESSURE PSIG | BTEX % REDUCTION | OXYGEN (FT. 3/HR) |
|---|---|---|---|---|
| 1 | 0 | 0 | BASE | 10 |
| 2 | 10 | 0 | −12 | 10 |
| 3 | 23 | 17 | −27 | 10 |
| 4 | 12 | 17 | −40 | 10 |
| 5 | 12 | 17 | −29 | 10 |

The reaction kinetics of BTEX reduction were first order with the number of pressurized stages. On the surface this may appear to be erroneous, but further analysis suggests that the oxygen propagation mechanism described herein was initiated by the different doses of ozone under pressure. The actual dose of ozone made no difference as long as the initiation took place at the proper pH (7 to 10) and there was sufficient oxygen to propagate the free radical chain oxidation. Note, particularly, the difference in BTEX reduction in stage two (10 mg/l dose) and stages four and five (12 mg/l dose). The difference here was the pressurized reactor, not the ozone dose.

A further embodiment of the invention will now be described with reference to the drawings, and in particular to FIG. 1 thereof. FIG. 1 depicts a new and improved water purification system with reduced free radical inducer embodying the principles and concepts of the present invention and generally designated by the reference numeral 10. More specifically, the system 10 for practicing one method of the present invention employs two stations, a contact station 12 and a media station 14. At the first station are two contact tanks 16 and 18 for the receipt of ozone, oxygen gas and water to be purified.

The first contact tank 16 is a co-current tank where water to be purified is fed from a pipe 24 through its lower end 20 to a lower extent of the tank for flow upwardly through the tank. It is then fed from the tank 16 through a line 22 at the upper extents of the two tanks. The input line 24 with the water to be purified has in association therewith a Venturi 26 used for the injection of fresh ozone from an ozonator (not shown). As a result, the co-current flow upwardly through the tank is of water to be purified as well as the ozone which is affecting the purification of the water.

Also at the first station is a second contact tank 18. The second contact is a countercurrent tank wherein water from the first tank is fed through line 22 to an upper extent of the second tank. The flow proceeds downwardly to an outlet line 28 adjacent to the lower extent of the second tank. Also entering the tank at a lower extent thereof is water fed back by a pump 30 by a feedback line 32 to provide additional ozone. Such ozone is fed through a second or recirculating Venturi 24 in the line between the pump and the recirculating input to the second tank 18 and discharged into the lower extent of the second tank through line 36. The pressure measured at the discharge of the recirculating Venturi 34 is preferably less than or equal to 6 pounds per square inch gage (PSIG). This gives a gas/liquid (v/v) ratio in the Venturi of at least 0.5, more preferably 0.75.

Water from the pump 30 is not only fed back to the second tank 18 from the first or contact station 12, it is also partially diverted through an elbow and fed through a supplemental line 38 to the second or media station 14. The media station 14 includes a media tank 42 with media 44. Such media 44 is preferably in the form of manganese dioxide. The media is preferably of the type disclosed in the parent application as identified hereinabove. Other forms of free radical inducers such as titanium dioxide or ultraviolet light could readily be utilized.

In a preferred embodiment, the particulate material is any one of several commercially available materials, principally containing manganese dioxide in excess of 99%, with trace materials in the amounts to enhance the catalytic and oxidation properties of the base manganese dioxide. Such granules conventionally range between 20–50 mesh and 90–100 mesh. This is between about 125 and 710 microns, about 0.058 and 0.0328 inches. Trace materials are as follows:

| PARAMETER | METHOD | RESULTS | UNITS | MDL |
|---|---|---|---|---|
| Aluminum | EPA 200.7 | 0.29 | mg/g | 0.00 |
| Copper | EPA 200.7 | 9.07 | µg/g | 1.38 |
| Iron | EPA 200.7 | 0.50 | mg/g | 0.00 |
| Magnesium | EPA 200.7 | 0.03 | mg/g | 0.00 |
| Manganese | EPA 200.7 | 623.42 | mg/g | 1.15 |
| Nickel | EPA 200.7 | 34.95 | µg/g | 2.30 |
| Silicon | EPA 200.7 | 0.19 | mg/g | 0.02 |
| Tin | EPA 200.7 | ND | µg/g | 115.23 |
| Zinc | EPA 200.7 | 3.76 | µg/g | 0.46 |

In the chart, the first column represents the trace material found. The second column is the government EPA (Environmental Protection Agency) method for testing. The next two columns show the detected quantities for each detected material. The designation mg/g represents parts per thousand while µg/g represents parts per million. The last column, MDL, is the method detection limit.

Other like media could be readily used. Even though the particulate material preferably acts as a catalyst to increase the speed at which chemical reactions occur within the containers, the particulate material does not affect the equilibrium of the reactions.

The media tank 42 (illustrated in FIGS. 1 & 2 as a catalytic reactor) has an upper section 46 and a lower section 48 with a medial support 52 therebetween. In this manner, water is fed from the lower extent of the tank to the upper extent through media 44 supported on the media support 74. In conjunction with pump 30, a pressure controlling device 54, a device with an orifice such as a valve, more preferably a fixed orifice, is located at the upper extent of the media tank for providing the appropriate pressure to the tank. Clean water is then fed from the third tank from its upper extent by outlet line 56.

The media support 52 is preferably fabricated of an imperforate material such as stainless steel and formed as a dish 60 with a circular bottom 62 and cylindrical side walls 64 and an open top for receiving the filter media 44. The dish has a diameter about half the diameter of the tank 42 in which it is located. Generally conical coupling walls 66 to form an inverted truncated cone, and are fabricated as extensions of the dish to couple the top of the dish with a central extent of the interior face of the media tank.

Water to be purified enters the dish for upward flow through the media by a vertical line 70. The upper end of the line 70 is coupled to a hole in the center of the bottom 62 of the dish. The lower end of line 70 is spaced from the bottom of the media tank 42. Within the media support 52 is a lower screen 74 upon which the media may rest. The increasing diameter of the inverted truncated cone (or similarly shaped coupling walls) serve to progressively reduce the velocity of water and/or media particles flowing upwardly therethrough . An upper screen 76 is spaced above the media to preclude particles of media from inadvertently entering the flow of water beyond its intended location within the media support.

Figure 3C:
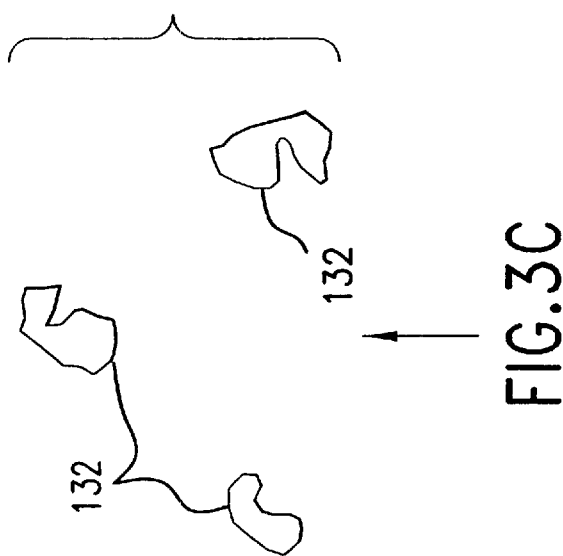
FIGS. 3A, 3B an 3C are greatly enlarged illustrations of media reacting to the flow of water and contaminants through and immediately above the media in the central extent of the media tank.
Figure 3B:
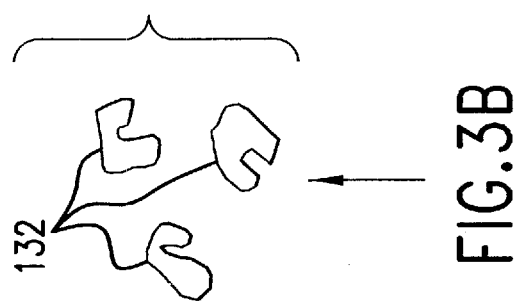
Figure 3A:
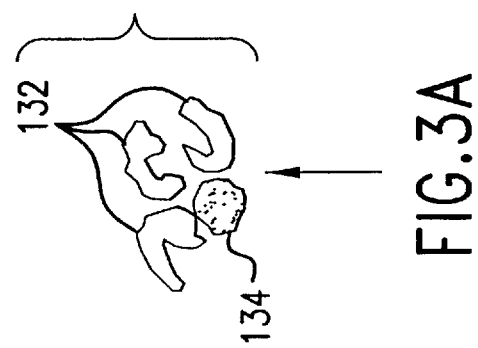

Shown in FIGS. 3A, 3B, and 3C are greatly enlarged illustrations of media in the upper extent of the media tank. In FIG. 3A, the flow of water through the media is too slow. As a result, contaminant particles 124 have become entrained with the closely packed media particles 126. As a result, water purification is less than optimum and the catalyst can become fouled and closely packed in the lower portion of inverted trucated cone. In contrast, in FIG. 3C, the velocity of water being purified is too high as it moves through the media particles 126. The particles are spaced to an excessive extent. As a result, catalyst particles can be carried by the fast flowing fluid upward out of the media tank. FIG. 3B illustrates relatively closely spaced media particles comprising a bed of particles that are properly fluidized for optimum for water purification and catalyst retention. In FIG. 3B, the particles allow maximum contact between the dissolved contaminant and the ozone/oxygen and media particles for optimized purification of the water flowing through the media support in contact with the media. This also keeps the catalyst from fouling by flowing more unreacted ozone over, around and between each individual granule.

Figure 8:
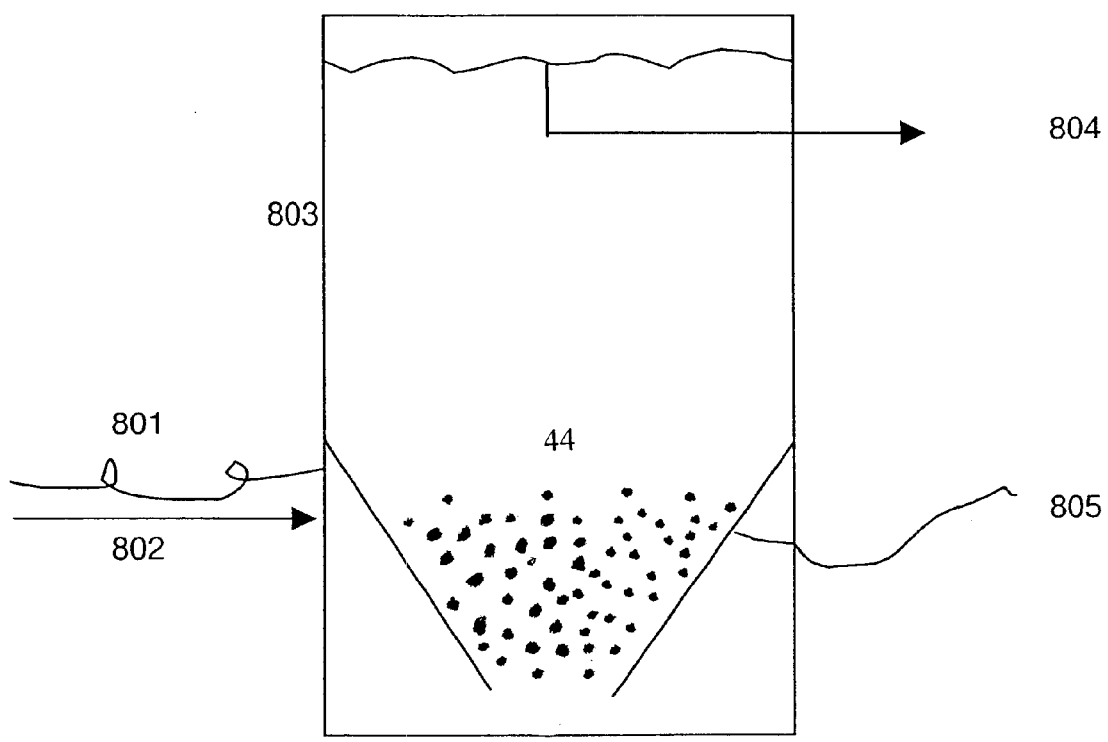
FIG. 8 is an enlarged schematic illustration of an alternative media tank.

A simpler alternative embodiment of a media tank that may serve as a catalytic reactor for inducing the production of free radicals is illustrated in FIG. 8. The side-walls of media tank 803 are connected (and preferably sealed) to the large diameter upper extent of an approximately conical coupling having a smaller diameter hole at its lower extent, so as to form an funnel shaped, inverted truncated cone. The smaller diameter hole in the lower portion of the truncated cone is situated near, but not sealed with the bottom of tank 803. The truncated cone serves to separate the media tank into a lower large bubble separation zone and an upper media zone that contains catalytic media (44).

Water containing contaminants, ozone, oxygen, and/or hydrogen peroxide is fed to an inlet in the lower large bubble separation zone (802). The water preferably predominantly comprises a supersaturated mixture of water and small bubbles of ozone and/or oxygen, but may comprise at least some large gas bubbles (i.e., visible bubbles having a diameter greater than about 0.9 mm). The large bubbles tend to rise in the large bubble separation zone, and are removed from the large bubble separation zone at an outlet (801) near the upper portion of lower large bubble separation zone, and recycled upstream. Small gas bubbles are entrained in the downward water flow, then flow upwardly through the hole in truncated cone 805, and contact the catalytic media (44). Smaller particles of the catalytic media are preferentially impelled upwards by the flow of water and small bubbles, as compared with the larger catalytic granules that tend to remain and predominate in the smaller diameter portions of cone 805. An the larger diameter portions of the truncated cone, fluid velocity is less than the terminal velocity of the catalyst fines and the granular fines fall back toward the cone, and thereby tend to become suspended and at least partially segregated by size, and thus not "settle" back towards the large bubble separation zone . Thus there is little need for means to support the catalyst, such as the lower screen 74 employed in the media tank illustrated in FIG. 2. The resulting "suspension" of small catalyst particles in the lower portions of the upper media zone near the conical coupling also tends to produce a high concentration of radicals in the water, favorably increasing the rate of decontamination of the water. The "suspension" of small catalyst particles in the lower portion of the upper media zone also tends to produce plug flow in the water/small bubble mixture that rises above the suspension and into the upper portions of the upper media zone.

In some embodiments of a media tank, as exemplified by FIG. 8, the outlet 801 is fluidly connected to a preferably tortuously shaped section of a relatively small diameter line (preferably about ¼"), so as to provide a pipe-friction means of controlling back pressure in the media tank.

Figure 2:
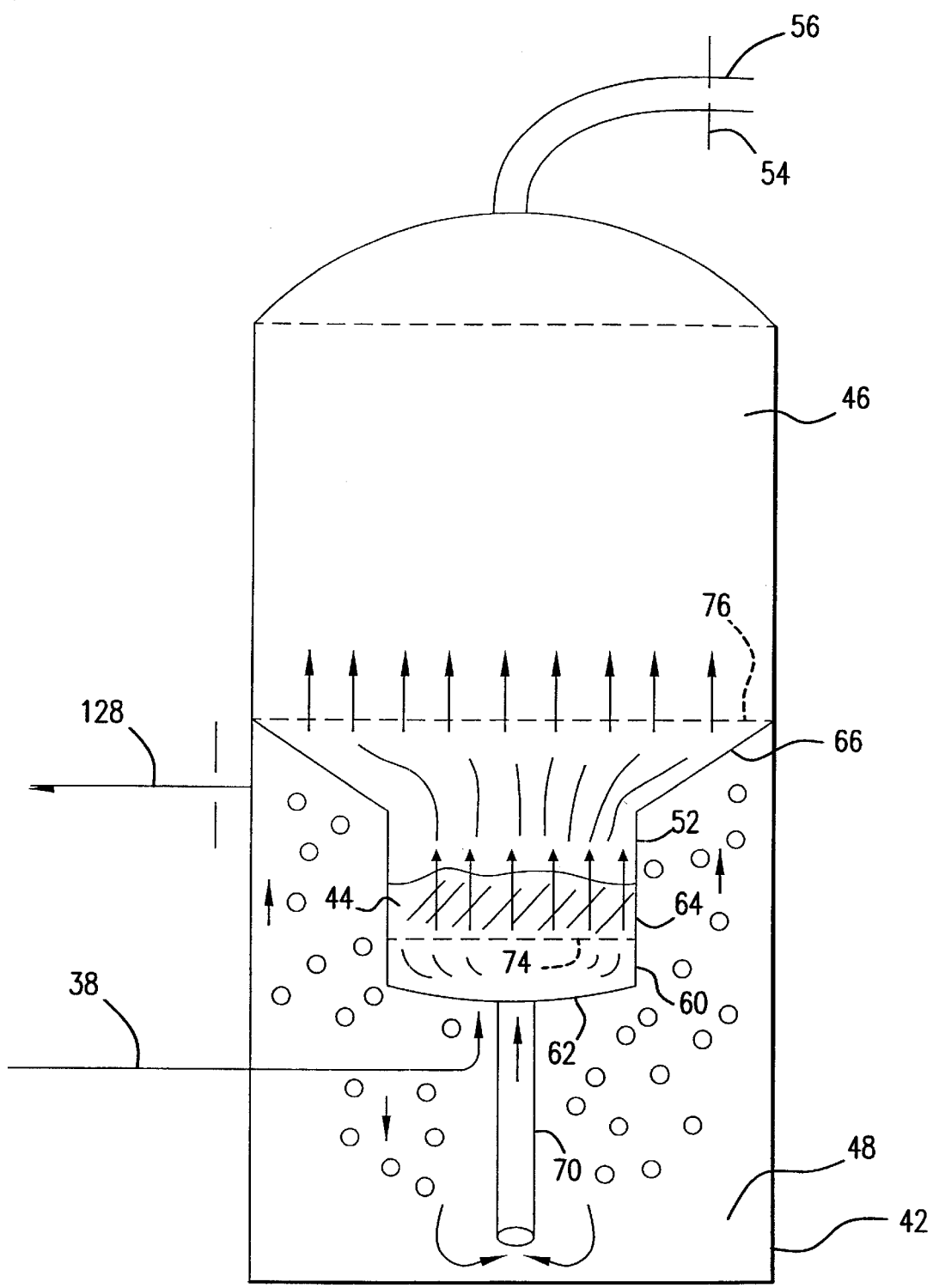
FIG. 2 is an enlarged schematic illustration of the media tank shown in FIG. 1.

In some embodiments, the outlet of the upper media zone comprises an outlet line 56 and/or a pressure controlling device 54, as shown in FIG. 2. In other embodiments, the outlet of the upper media zone comprises the purified water discharge means 804 shown in FIG. 8, that may optionally direct the water toward additional purification devices, such as supplemental stations.

A plurality of supplemental stations may be provided in series following the media tank. As illustrated in FIG. 1, each of the supplemental stations is preferably provided with an additional contact tank 80 similar to the first contact tank 18. Each supplemental station may also be provided with an additional media tank 82 similar to the first media tank 42. Coupling between the supplemental tanks is the same as the coupling between the first tanks. It is preferred to include a common feedback line 122 for the exhaust gasses of the various tanks. Exhaust gasses, excess water, and scum recycled by line 122 enter holding tank 88 and contact the contaminated water therein. The exhaust gas and any ozone therein may be vented, but are preferably indirectly recycled downstream, via means such as line 87 and an early venturi such as venturi 26. Fresh ozone is preferably supplied to the downstream contact tanks of the system, such as 18 and 80. For example ozone source 90 and line 86 may be employed to feed venturis 34 and 35 as shown in FIG. 1. The first contact tanks and first media tank form a first module while the supplemental contact tank and supplemental contact and media tanks form a second module. Any number of modules could be utilized as a function of the particular application.

In addition to the components of the present system, the subject matter of which applications are incorporated herein by reference, peroxide. As illustrated in FIG. 1, Peroxide 102, $H_2O_2$, in the form of a solution, may also be added in small doses to the water being purified, to aid the formation of free radicals in the water. The addition of peroxide is preferably prior to the media tank or tanks, and/or spaced along multiple points for maximum efficiency. Peroxide 102 is stored in a reservoir 104 with lines 106 and 108 coupled to Venturis 110 and 112 in the lines 38 and 114 feeding water from the contact tanks 18 and 80 to the media tanks 42 and 82.

Each Venturi 110 and 112 is adjusted to create a small pressure drop of about 6 psig, plus or minus about 10%, whereby the peroxide will be drawn by suction into the water entering the media tanks. Those skilled in the art will recognize various ways to add peroxide. Orifices 118 and 120 are positioned in the lines 106 and 108 to the Venturis 110 and 112 to provide the measured amounts of peroxide into the system. The Venturis provide an intimate mixing of the water and peroxide.

An alternate approach to peroxide introduction is to couple the upper ends of the lines 106 and 108 to the lines immediately in advance of the pumps 30 and 124. Such arrangement mixes the water and peroxide and dispenses the peroxide through the extraction and the reaction unit operations.

The various controls for the system of the present invention may be done manually or integrated with respect one to another through continuous and automatic controls. In addition, further safety devices may also be employed. For example, the lines 122 shown in FIG. 1, with associated optional valves, are suitable for allowing the bleeding off, removal, or recycle of excess liquid, gas, and/or scum from the various tanks throughout the system. Additionally, the scum and /or exhaust gases containing residual ozone are thereby recycled upstream, for farther treatment and/or use. As shown in FIG. 1 (and FIGS. 4–6, and 9), the scum and ozone containing exhaust gases may be mixed with contaminated water. The mixing may optionally occur in a feed tank for the contaminated water.

The first station as described above, is an integral part of the water purification system. In association with the first station is the co-current tank in which the purification gas ozone and oxygen is added in gross amounts to the liquid to be purified. The mixture of gas and water both move in the upward direction. The mixture may then be transferred to the upper portion of a countercurrent tank. In some embodiments, a recirculating mixture comprising water and additional oxygen and/or ozone is fed into a pipe at the upper extent of the countercurrent tank, and moved downwardly, where it is released and the large bubbles of gas may move upwardly. The small bubbles and water move downwardly into a manifold being drawn by a pump. The movement of the gas and liquid through the countercurrent tank effects a preclassification of the bubbles into larger bubbles and smaller bubbles. The movement of bubbles into the larger diameter countercurrent tank, from the downcomer pipe allows bigger bubbles to rise and the smaller bubbles to flow down and into the manifold and pump, producing an intermediate classification of the bubbles. This intermediate classification effects the removal of all bubbles larger than approximately ¼" in diameter to move upwardly for further processing while only the bubbles smaller than ¼" are moved into the pump which prevents the pump from cavitating. This is a further preclassification by bubble size.

The pump functions not only for feeding liquid and gas, but also for pressurizing, mixing and increasing the population of fine bubbles. In this context, it is a fine bubble generator. The liquid and fine bubbles, at this point following the pump existing as a large number of very fine bubbles <⅛" in diameter, are then fed into the media tank through a variable size orifice. The media tank is formed of an upper zone and a lower zone. The lower zone is a final classification zone and/or a disinfection zone. The upper extent of the reactor tank is a decontamination zone having free radicals wherein the purified water and small bubbles less than 0.1 millimeters in diameter move in plug flow fashion to the exterior of the tank. During such movement, a variable orifice device maintains the correct pressure within the vessel. Between the upper and lower zones is the media and the media support.

From the pump the liquid and gas enters the upper extent of the lower zone. At this point, the larger bubbles move upwardly where they are vented through an upper line back to the counter current tank. The smaller bubbles are then entrained in water and sucked into the lower extent of the tube for movement through the media.

Most prior art devices continuously bubbled gas through the contaminated liquid to maintain high concentrations of dissolved oxidizers. Other devices saturate the liquid and directed gas-free, supersaturated liquid into a reactor.

In previous systems, plug flow was lost due to turbulence induced by fast rising bubbles having velocities in excess of about 3 in/second. This required multiple reactors in series to achieve the low levels of contaminants at the discharge.

In more recent art, concentrations of oxidizers decline as the reaction precedes. Thus, the reaction rate drops off toward the end of a plug flow reaction. The present invention achieves and maintains the thermodynamic maximum of dissolved oxidizers by eliminating all bubbles sufficiently large to cause turbulence (i.e. visible gas bubbles having a diameter greater than about 0.9 millimeters), and by increasing the population of micro-bubbles, bubbles less than 0.1 millimeters in diameter, such that the rate of gas solubilization exceeds the rate of oxidizer consumption. In other words, the replenishment rate exceeds the use rate and plug flow conditions are rigorously maintained. This unique combination increases the oxidizing efficiency and reduces the size and complexity of the reactors.

The optimal operating conditions for the reactor are substantially at, but just below the visible bubble stage. At these conditions, the decontaminating fluid has the maximum practical ozone concentration. Those skilled in the art could, with only routine experimentation, design three-phase fluid bed reactors that retain substantially all the catalytic granules in the reactor, even after the granules grind themselves into very fine particles. Prior devices, however, cannot achieve this because of the presence of large bubbles in the gaseous phase. For example, the presence of fast rising gas bubbles creates turbulence as bubbles rise faster than the surrounding liquid. These bubbles then carry granule fines with them, thereby carrying catalyst out of the reactor vessel. Prior devices then had to attempt to recapture the fines, dispose and replace or recycle fines, or attempt to hold the catalyst in filter bags and distribute fluid through the filter bags. The simple process of the present invention substantially eliminates all of this unnecessary complexity and efficiently solves the problems of the prior art systems.

By available oxygen, it is meant that oxygen which is dissolved in the water and is available to react with contaminants. The amount of oxygen or ozone dissolved is a function of temperature, pressure and availability of other gasses such as nitrogen gasses. Oxygen, as well as ozone, does not react quickly in a gaseous form. Making the oxygen available for intimate contact with contaminants in solution is a key to chemical efficiency of the process.

In FIGS. 3A, 3B and 3C, the FIG. 3A embodiment with the speed of the fluid being 20 will function as a reactive filter. In the FIG. 3B showing, with the liquid moving at a proper velocity, the catalyst acts as a fluidizer bed in the intended manner. With the excessively high velocity of FIG. 3C, the media particles are not efficient since they effect bed scattering of particles as well as loss of catalyst out of the flow of the liquid in the reactor bed. It is important that the catalytic bed be fully fluidized for the embodiment to work effectively. A velocity too low causes fouling, for example, the bed actually filters out sticky, contaminants if the individual granules are not lifted and separated. If the velocity is too high, then the granules carry up and out of the bed. An optimal velocity is substantially at the fluidization point, the point of maximum bed height. At this point, the maximum amount of ozonated, oxygenated fluid is flowing around and between each granule. See FIGS. 3A, 3B and 3C.

The instantly claimed invention can be practiced on any aqueous stream which contains an unacceptable level of impurities, such as suspended matter, organics, dissolved mineral matter, dioxins, microorganisms, and color bodies. The amount of ozone used in the practice of the present invention should be an effective amount. Typically, such an amount will be in a feed gas with ozone concentration of 1 to 10% by weight, preferably generated from oxygen carrier gas. Prior art processes use high doses of ozone and exhaust substantial quantities of unextracted ozone to the atmosphere, or to ozone destruct units, or to recycle dryers or feed tanks. Dickerson suggests that the dose be reduced until the point where no breakthrough of ozone is detected but does not say what to do if the desired level of waste water cleanup is not achieved at these no breakthrough levels.

In practice, users are most interested in meeting the regulatory requirements for discharge of the waste water. Only after this quality requirement is achieved, are they interested in low cost ozone generation. As Dickerson shows in his examples, there is substantial loss of ozone (29%) when 200 ppm ozone is added to 4 modules, averaging 50 ppm per module. When less ozone is applied (ca 100 ppm or 25 ppm per module) there is less wasted ozone (12%), but instead of an 83% reduction in unwanted color at the higher dose, there is only a 50% reduction at the lower ozone dose. By extrapolation, if the Dickerson process is reduced until the point where no breakthrough of ozone is detected, the customer quality limit may not be achieved.

The present invention solves the scum dilemma of the prior art, retains the high dose potential of Dickerson, the free radical inducer of Leitzke, Ditzler and van Staveren and does it all without wasting ozone and within a single module. This is done by the surprising method of unbundling the exhaust gas flows and recycling high concentration gas into low concentration streams that are high in ozone demand and exhausting the then substantially ozone-free gas. Thus, the dirtiest water is used to scrub the exhaust gas. When the waste stream requires still higher doses, two or more modules of the present invention can be serially connected and still not waste any ozone. These subsequent modules are added to achieve additional clean up, not to reduce residual ozone in the exhaust gases. Each module achieves substantially the same percentage clean up, defined as concentration of substrate out divided by concentration of substrate in for any specific module. This simplicity and reduction in cost and equipment distinguishes the present invention from all prior devices while achieving similar or superior quality results.

The instantly claimed invention can be practiced on any aqueous stream which contains an unacceptable level of impurities, such as suspended matter, organics, dissolved mineral matter, dioxins, microorganisms and color bodies. Non-limiting examples of such aqueous streams include effluent streams from such industries as the chemical industry, the pulp and paper industry, petrochemical and petroleum refining, as well as municipal water supplies and bilge water clean-up. Of particular importance are the waste streams generated from cleaning petroleum transport and storage tanks, such as crude oil and gasoline barge washout water. This water is typically collected and gravity separated. The oil phase is recovered and the water phase is discharged. This water phase typically contains 20–50 mg/l of oil and grease and 5 to 75 mg/l BTEX (benzene, toluene, ethylbenzene and xylene).

Regulations permit, in Louisiana brackish water for example, 15 mg/l oil and grease and 0.5 mg/l BTEX in the discharge. Strong oxidizing agents, such as ozone, are capable of breaking these high molecular weight molecules into smaller molecules, which are more biodegradable. Ozone is a highly reactive gas at ambient temperatures and pressures and must be generated on site due to its reactive nature by using either compressed air or oxygen as a feed gas. Oxygen is preferred because residual nitrogen from air generation reduces the absolute amount of oxygen that can be dissolved in water. The ozone is introduced with a feed or carrier gas, preferably oxygen, into the purification zones where at least a portion of it dissolves in the aqueous stream and reacts with impurities of the stream.

The amount of ozone used in the practice of the present invention should be an effective amount, i.e., at least the amount which will react with the contaminants of the stream. Typically such amounts will be at least about 3% ozone in the carrier gas stream. In practice, higher concentrations of ozone are desirable, from 4 to about 13% in oxygen, more preferably 7–10% ozone. In the prior art, practitioners were encouraged to reduce the amount of ozone used to prevent breakthrough of excess, unused ozone. In the present invention, practitioners are encouraged to use sufficient ozone to achieve the level of clean-up desired. The present invention will extract any unused ozone. For particularly dirty streams, batch recirculation is often needed to completely remediate the waste water.

Figure 4:
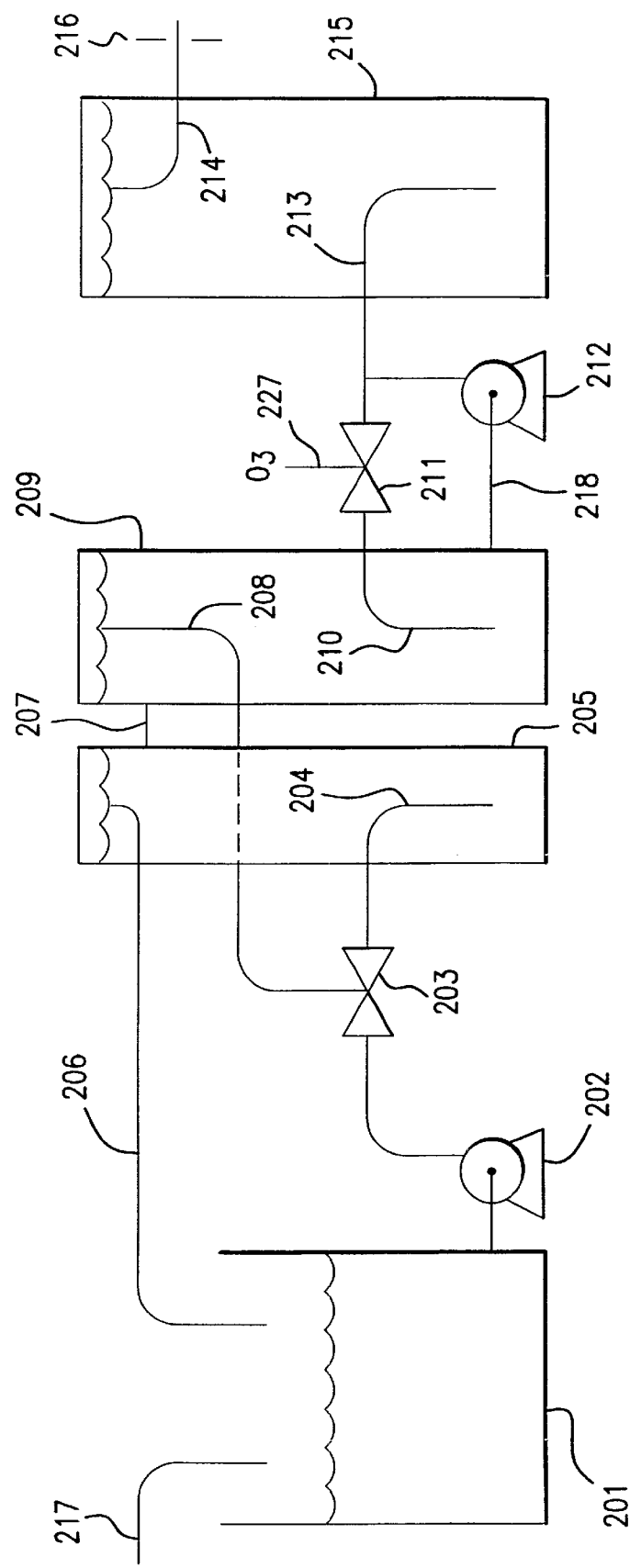
FIGS. 4 through 6 are enlarged schematic illustrations of an alternate embodiment of the invention.

Turning now to FIG. 4, there is shown a preferred three-vessel process module wherein an aqueous waste stream to be purified is fed via line 217 to a feed tank 201. The level of the feed tank 201 is controlled by standard means. The aqueous waste is pumped through pump 202 to serially connected Venturi 203. High ozone-containing exhaust gas from countercurrent extraction vessel 209 is pulled through communicating means 208 into double scrubbing Venturi 203 and discharged via communication means 204 into the bottom of extraction vessel 205. Twice-scrubbed gas from Venturi 203 and commingled dirty water from feed tank 201 flow cocurrently from bottom to top of cocurrent extraction tank 205. Excess water and twice-scrubbed, relatively-large-bubble gas exit extractor 205 through communicating means 206 back to the feed tank 201. Some fluids to be cleaned are particularly sudsy and the gas/liquid mixture exiting through means 206 can be very sudsy, and will not break on its own. In this situation, a portion of the water from pump 202 can be diverted through a spray nozzle to the top of feed tank 201. Such spray effectively eliminates the suds in the feed tank.

Relatively-small-bubbles are entrained in the fluid at the top of extractor 205 and carry over through communication means 207 to extractor 209. The small-bubble-gassy fluid flows down extractor 209 towards outlet means 218. Gassy fluid flows through outlet means 218 into pump 212. The small bubbles are pressurized and intimately mixed in pump 212 to form micro bubbles with a greatly enhanced bubble surface area. This micro bubble, aqueous fluid behaves like a single phase fluid even though the fluid is typically between 15 and 25% gas by volume before pump pressurization. The micro bubble fluid passes via communication means 213 to Venturi 211 and simultaneously to free radical generator 215. Fresh, high concentration ozone is introduced via a communicating means 227 to Venturi 211 from an ozonator. It is well known that standard Venturis (Mazzei, Bakersfield, Calif.) dissolve most of the ozone instantly in the Venturi. The micro bubble fluid and fresh ozone are intimately mixed in the Venturi 211 and discharged into the bottom of extractor 209 via communication means 210. The absolute pressure of the ozone gas in communication means 227 is slightly less than atmospheric pressure. About half of the fluid forms a recirculating loop from outlet means 218 through pump 212 through Venturi 211 through means 210 back to outlet means 218. This loop builds ozone concentration in means 213 and adds fresh gas to the system. Not all the ozone is extracted in extractor 209. The excess, unused ozone rises to the top of extractor 209 as relatively large bubbles and is separately discharged through communication means 208 to the upstream Venturi 203 where final extraction takes place as previously described.

Micro foamy, freshly ozonated fluid passes serially from the recirculation loop through communication means 213 into free radical inducer 215. This fluid travels through the free radical inducer in plug flow, finally exiting the inducer reactor through communication means 214. Back pressure on the reactor is maintained by orifice 216 or other well known means for pressure control. Those skilled in the art will recognize that any number of well known free radical inducers could be used. Non-limiting examples of free radical inducers include, an ultraviolet light source, added hydrogen peroxide, added peroxide and UV light, catalytic reactors of assorted designs, pressurized reactors as illustrated here, non-pressurized reactors, ultrasonic inducers and the like. What is critical is that there is more than one extractor zone, that the fresh ozone inlet pressure is less than atmospheric and that the high concentration exhaust gas from the extractor that first receives fresh ozone is captured separately and is recycled to a second extractor. The gas from the second extractor is then substantially ozone-free and can be exhausted directly. Better secondary scrubbing is achieved with an intimate mixing device such as a venturi, but those skilled in the art will recognize that in-line mixers or clever diffusers in the second extractor can accomplish the same function.

Figure 5:
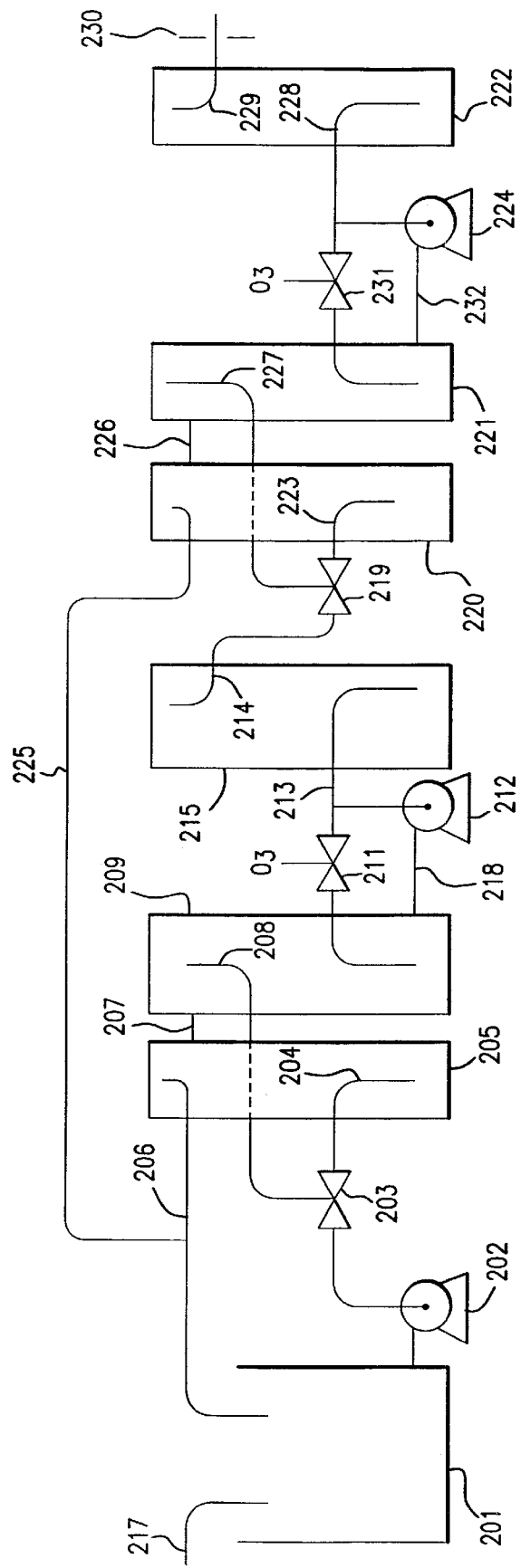

Turning now to FIG. 5, an embodiment of two or more module configurations is shown. The process from feed tank 201 to reactor 215 is essentially as described above, except that communicating line 214 from reactor 215 serially connects with Venturi 219, not orifice 216. In this fashion, the system pumping energy is reduced because the high pressure in reactor 215 is reduced through the double scrubbing Venturi 219. Venturi 219 pulls single scrubbed gas from extractor 221 through communicating means 227 into Venturi 219 where double scrubbing for module 302 commences. Double scrubbed fluid exits Venturi 219 via communicating means 223 into extractor 220. Double scrubbed gas travels cocurrently with partially cleaned fluid from the first module upwards in extractor 220. Double scrubbed, substantially ozone-free gas exits extractor 220 through communicating means 225 back to the feed tank 201, bypassing the first module. Small-bubble gas and partially cleaned fluid transfer to extractor 221 through communicating means 226 and eventually on the free radical inducer zone as previously described.

Figure 6:
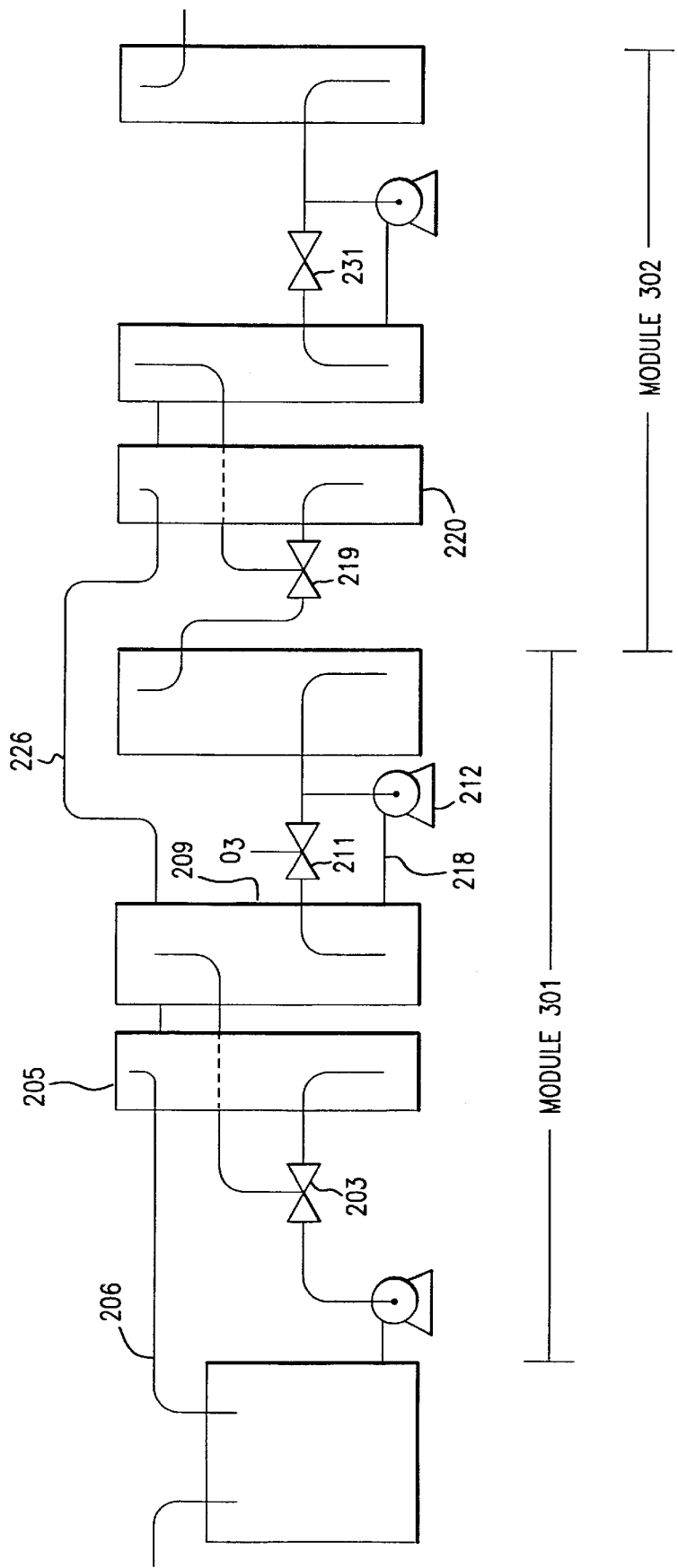

Turning now to FIG. 6, the process is essentially as described in FIG. 5, except that twice scrubbed gas and excess fluid from module 302 extractor 220 is fed back to module 301, extractor 209 via communication means 226. In this way, extractor 209 is kept in a flooded condition. This rather simple fluid communication strategy accomplishes a number of important goals, namely that automatic level control systems are eliminated, that all columns are continuously skimmed of scum and that all scum is returned to the feed tank 201. Traditional techniques are used to control or separate returned scum. Those skilled in the art will recognize that the pressures of the various pumps feeding the Venturis are important, as is the backpressures that those Venturis experience. These two key variables substantially control the gas/liquid ratio in the Venturis. Venturis 203 and 219 are designed to draw all the gas that is fed to Venturis 211 and 231 to insure double scrubbing in each module. In practice, the gassy fluid that is fed from outlet means 218 to pump 212 compresses in the pump and the pump is not as efficient as one skilled in the art would expect. In addition, pump cavitation is a problem if all the large bubbles are not allowed to escape in extractors 205 and 209. Traditional techniques can be used to solve these problems.

As described above, hydrogen peroxide may be employed in the methods of the invention, and/or added to the apparatus described hereinabove, so that the hydrogen peroxide acts as a catalyst and/or initiator to decompose ozone into high energy free radicals. This phenomenon can be used to decrease the number of scrubbing vessels required to purify contaminated water.

Figure 9:
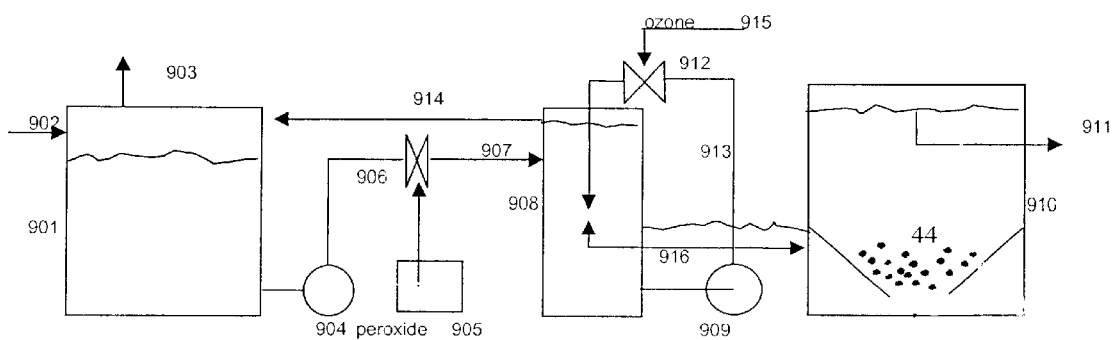
FIG. 9 is a schematic illustration of an embodiment of the invention in which hydrogen peroxide is added to a first station for introducing ozone and/or oxygen into water to be purified.

In these embodiments, contaminated water and hydrogen peroxide are introduced into a first station having a recirculating injector for introducing ozone and/or oxygen into the water. The recirculating injector generates an intimate mixture of the hydrogen peroxide, contaminated water, and small bubbles of ozone and/or oxygen gas. A stream comprising the mixture is then fed to second station comprising at least one section having a free radical inducer, to convert at least a portion of the ozone into free radicals, for reaction with the contaminants in the water. FIG. 9 illustrates one preferred embodiment of the method and/or apparatus employed.

In FIG. 9, water having contaminants is supplied to a feed tank 901 having a water inlet 902, and a gas vent 903. The contaminated water and hydrogen peroxide are provided to a first station, illustrate in this example as including vessel 908. In FIG. 9, the contaminated water is transferred via pump 904 to a venturi 906, which mixes the contaminated water with hydrogen peroxide supplied from vessel 905, and supplies the contaminated water and hydrogen peroxide mixture to vessel 908 through a first station inlet 907. Most of the contaminated water and hydrogen peroxide flow downward in vessel 908, but excess contaminated water and hydrogen peroxide (as well as scum and large gas bubbles of ozone and/or ozone) flow upward toward the upper extent of vessel 908, then out return line 914, and back to the feed tank 901. Any unreacted ozone from the large gas bubbles is contacted with ozone in the contaminated water in return line 914, which tends to dissolve decompose and/or scrub residual ozone, minimizing ozone loss through gas vent 903.

In FIG. 9, the first station comprises a countercurrent tank having a recirculating injector, adapted for introducing ozone and/or oxygen into the contaminated water. Vessel 908 has a liquid outlet at or near its lower extent, fluidly connected to a pump 909. Pump 909 receives a stream of water(and hydrogen peroxide, ozone, and/or oxygen) from vessel 908, and supplies the water through line 913, to venturi 912, which mixes the water with fresh ozone and/or oxygen gas (915). The ozonated and/or oxygenated mixture produced by venturi 912 is recirculated to and/or injected into vessel 908, preferably via an injector outlet in the middle or lower extent of vessel 908. The stream of water and gas produced by pump 909 is also recirculated to vessel 908 through injector means 916, at a substantially equal rate and opposite direction to that emerging from the injector outlet, as taught by Bettle in U.S. Pat. No. 5,772,886, which is hereby incorporated by reference in its entirety. Preferably, the opposing fluid streams impinge one to the other at a Reynolds number greater than about 2300 (i.e. non laminar flow), producing immediate mixing and micronization of the gas (i.e. formation of bubbles having a diameter less than 0.1 mm). Larger visible bubbles formed (above about 0.9 mm in diameter) tend to rise in vessel 908. By these arrangements, hydrogen peroxide, ozone, and/or oxygen are intimately intermixed with recirculating contaminated water, in a manner that provides micronization and/or classification according to bubble size.

Contaminated water, intimately intermixed with hydrogen peroxide and micronized gas, flows downward in vessel 908, and pressurized in pump 909. A portion of the output of pump 909 is diverted and fed to a second station, such as the second station, such as that shown in FIG. 9 as vessel 910. Thus a disproportionate amount of the introduced ozone is fed forward to the second station in the form of a supersaturated stream comprising contaminated water, hydrogen peroxide, and micronized gas. The ozone and/or oxygen content of this supersaturated stream is substantially above that which would be predicted by Henry's Law, and is accomplished in a relatively small, inexpensive, and simple apparatus.

The second station of FIG. 9 provides for decomposition of the ozone into free radicals, for reaction with contaminants. This objective may be accomplished by media station devices having catalytic media, such as device 910. This objective might optionally be provided by second stations similar to the catalytic media stations illustrated in FIGS. 1 and 2, or the second station arrangements illustrated in FIGS. 4–6. Those skilled in the art might also substitute or add a second station that employs UV light to decompose the ozone. Preferably, the second station maintains supersaturation of the steam in the second stage, and/or provides for plug flow, so as to maximize purification of the water.

EXAMPLES

The above described process schemes represent embodiments wherein ozone is introduced at the opposite end of the extraction portion of each module to the aqueous stream and is then passed through the extraction section of the module countercurrent to the other materials. The single module embodiment shown in FIG. 4 is best used for lightly contaminated or very contaminated streams. With lightly contaminated streams, such as tertiary treatment of municipal waste from a standard package treatment plant, partially cleaned water is fed from the POTW to the FIG. 4 embodiment. When 30 mg/l of ozone was added to a stream with BOD of 300 and TSS of 35, no free ozone was emitted and the final BOD was significantly reduced and the TSS was less than 15.

In another embodiment, highly contaminated water, 10,000 mg/l COD, 24% by weight salt and 25–200 mg/l 4-nitro phenol, was recirculated through the FIG. 1 embodiment 10 times. The nitro phenol was at non detect with 44 mg/l ozone continuously fed through Venturi 211. No free ozone was observed in the exhaust gas.

In an embodiment similar to FIG. 5, extractors 205 and 220 were removed. The aqueous stream was produced water from crude oil production. This stream is anaerobic with large quantities of reduced iron, oil and grease (20–200 mg/l) and BTEX (2.5 mg/l). With cocurrent extractors 205 and 220 removed, the average BTEX was reduced 41% in each free radical inducer reactor. When extractors 205 and 220 were added back to the process in FIG. 2, the BTEX was removed at up to 90% per free radical inducer reactor. Without wishing to be bound by theory, it is believed that this unexpected large difference was due to small bubble formation in extractors 205 and 220 that serially communicated with extractor outlet means 218 and 232. Ozone systems are generally capable of propagating reactions that are initiated with ozone and propagated with dissolved oxygen. By creating large volumes of high surface area micro bubbles in Venturis 203 and 219 and in pumps 212 and 224, this propagating reaction is believed to be encouraged.

In another example using the FIG. 4 embodiment, highly contaminated gasoline barge washout water was treated one time only. The incoming water had 73 mg/l of oil and grease, and almost 93 mg/l BTEX. After injecting 44 mg/l ozone into Venturi 211, the effluent water showed 43 mg/l oil and grease and 60 mg/l BTEX. Thus the oil and grease was reduced 41% and the BTEX was reduced 35% injust one pass through the reactor module. There was no ozone in the exhaust gas. Another measure of efficacy is the absolute amount of clean-up per weight of ozone used. Under this measurement, 1.4 mg of contaminant were removed per mg of ozone. In subsequent experiments, where the washout water was recirculated, oil and grease and BTEX were reduced to permit dischargeable levels.

In still another experiment, on gasoline barge washout water, the back pressure on the Venturis was increased to 0.1 psig. Very little removal of oil and grease or BTEX was observed.

In still another experiment with cyclohexanone, peroxide was added at the inlet of the pump. The optimum ozone/peroxide mole ratio was 2:1. The pH was adjusted to 9.5. There was a significant reduction in COD with catalyst, ozone and peroxide versus ozone and peroxide alone. Without wishing to be bound by theory, this is thought to be the result of ring opening by the ozone and peroxide-generated hydroxyl radicals and subsequent secondary oxidation by the oxidizer and catalyst. It is well known that the oxidizers formed by granular catalysts are not as energetic as oxidizers formed directly by ozone and peroxide, i.e., the former does not open rings, but does oxidize fragments of rings already oxidized by the ozone and peroxide free radicals. Since most regulatory limits are set as COD limits, further oxidation is beneficial.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for purifying water comprising:
   (a) mixing water containing one or more contaminants with at least one oxidizer selected from among ozone and oxygen gas to form a reaction mixture,
   (b) contacting the reaction mixture with a free radical reaction initiator suitable to convert at least a portion of any ozone in the reaction mixture into free radicals; and
   (c) reacting at least a portion of the contaminants with the oxidizer(s) to reduce the level of contaminants in the water, wherein the reaction mixture is maintained under reaction conditions during the reaction step which are effective to provide gas bubbles less than about 0.1 mm in diameter without forming essentially any visible gas bubbles.

2. The method of claim 1 wherein step (c) is performed under plug flow reactor conditions.

3. A method for purifying water comprising:
   a) mixing water containing one or more contaminants, with an oxidizer comprising ozone gas and/or oxygen gas to form a reaction mixture in a first station;
   b) feeding a first stream of the reaction mixture from the first station to a first section of a second station;
   c) contacting the first stream with a free radical reaction initiator to convert at least a portion of any ozone in the reaction mixture into free radicals;
   d) feeding a second stream from the first section of the second station into a second section of the second station for reacting the contaminants with the oxidizer, which second section is devoid of a free radical reaction initiator, and wherein the pressure at the second station is controlled so as to provide a flow of fluid therethrough having gas bubbles less than about 0.1 mm in diameter but essentially no visible gas bubbles.

4. The method according to claim 3 wherein the first station includes a recirculating injector for introducing additional ozone and/or oxygen gas into the reaction mixture.

5. The method of claim 4, wherein the recirculating injector is arranged so as to feed additional ozone and/or oxygen gas into the first station while also feeding the first stream from the first station to the second station.

6. The method of claim 3, further comprising one or more additional second stations, which receive effluent from step (d).

7. The method of claim 3, wherein the pressure in step (d) is maintained above atmospheric.

8. The method of claim 3, wherein free gas is collected and recycled before substantially gas-free, thermodynamically maximized, supersaturated liquid passes through a plug flow reactor.

9. The method of claim 3, further comprising the removal of excess water, gas, and/or scum from the first and/or second stations.

10. The method of claim 9, further contacting the excess water, gas, and/or scum with the water containing contaminants, and recycling at least some of any gas to the first station.

11. The method of claim 4, wherein the first station comprises a co-current tank and a counter-current tank, each tank having upper and lower extents, wherein the reaction mixture is fed from the co-current tank to the counter-current tank.

12. The method of claim 11, wherein the recirculating injector introduces ozone and/or oxygen to the lower extent of the counter-current tank.

13. The method of claim 11, wherein the upper extent of the counter-current tank is fluidly connected to a holding tank for the water to be purified, and excess liquid and scum is fed from the counter-current tank to the holding tank.

14. The method of claim 3, further comprising adding hydrogen peroxide to the reaction mixture.

15. The method of claim 3, wherein the first section of the second station comprises a reaction chamber having a lower classification zone and an upper decontamination zone, separated and fluidly connected by a truncated conical coupling having a hole therein.

16. The method of claim 15, wherein the free radical inducer comprises a particulate material.

17. The method of claim 16, wherein the first stream flows from the classification zone, through the hole in the truncated conical coupling, and through the particulate material.

18. The method of claim 17, further comprising supplying the first stream at a velocity that induces the formation of a fluidized bed of the particulate material.

19. The method of claim 3, wherein the second stream moves in plug flow through the second section of the second station.

20. The method of claim 3, wherein second section of the second station is substantially free of bubbles having a diameter greater than about 0.1 millimeters.

* * * * *